United States Patent
Manchester et al.

(10) Patent No.: US 10,667,018 B2
(45) Date of Patent: May 26, 2020

(54) ASYNCHRONOUS WORKFLOWS

(71) Applicant: Time Warner Cable Enterprises LLC, New York, NY (US)

(72) Inventors: Eric Manchester, Rockville, MD (US); Matthew Cashner, Richmond, IN (US); Benjamin Lukehart, Aurora, CO (US)

(73) Assignee: TIME WARNER CABLE ENTERPRISES LLC, St. Louis, MO (US)

( * ) Notice: Subject to any disclaimer, the term of this patent is extended or adjusted under 35 U.S.C. 154(b) by 938 days.

(21) Appl. No.: 15/154,030

(22) Filed: May 13, 2016

(65) Prior Publication Data

US 2017/0329791 A1    Nov. 16, 2017

(51) Int. Cl.

| | |
|---|---|
| *G06F 16/00* | (2019.01) |
| *H04N 21/647* | (2011.01) |
| *H04N 21/27* | (2011.01) |
| *H04N 21/2747* | (2011.01) |
| *H04N 21/472* | (2011.01) |
| *G06F 16/43* | (2019.01) |
| *H04N 21/84* | (2011.01) |
| *H04N 21/436* | (2011.01) |
| *G06F 16/68* | (2019.01) |
| *G06F 16/78* | (2019.01) |
| *G06F 16/48* | (2019.01) |

(52) U.S. Cl.
CPC ....... *H04N 21/64707* (2013.01); *G06F 16/43* (2019.01); *G06F 16/48* (2019.01); *G06F 16/68* (2019.01); *G06F 16/78* (2019.01); *H04N 21/27* (2013.01); *H04N 21/2747* (2013.01); *H04N 21/436* (2013.01); *H04N 21/47202* (2013.01); *H04N 21/84* (2013.01)

(58) Field of Classification Search
CPC ............... G06F 16/48; G06F 17/30274; G06F 17/30846; G06F 16/68; G06F 16/78
USPC ........................................................ 707/608
See application file for complete search history.

(56) References Cited

U.S. PATENT DOCUMENTS

| | | |
|---|---|---|
| 7,792,963 B2 | 9/2010 | Gould |
| 7,941,823 B2 | 5/2011 | Hasek |
| 8,181,209 B2 | 5/2012 | Hasek |
| 8,516,529 B2 | 8/2013 | Lajoie |
| 10,069,757 B1 * | 9/2018 | Young .................. H04L 47/822 |

(Continued)

OTHER PUBLICATIONS

Cable Television Laboratories, Inc., Metadata Specifications, CableLabs Asset Distribution Interface Specification Version 1.1, MD-SP-ADI1.1-C01-120803, Aug. 3, 2012. pp. 1-35.

(Continued)

*Primary Examiner* — Thu Nguyet T Le
(74) *Attorney, Agent, or Firm* — Otterstedt, Wallace & Kammer, LLP

(57) ABSTRACT

At least a first goal is assigned to a media asset including content and metadata. For at least two of a plurality of processes of a workflow engine relevant to said at least first goal, said media asset is simultaneously polled from time-to-time to determine whether prerequisites of said at least two of said plurality of processes have been met. For at least one of said plurality of processes of said workflow engine for which said prerequisites have been met, said media asset is acted on to achieve at least a portion of said at least first goal.

20 Claims, 10 Drawing Sheets

(56) References Cited

U.S. PATENT DOCUMENTS

| | | | |
|---|---|---|---|
| 10,158,709 B1* | 12/2018 | Muniswamy-Reddy | H04L 67/1095 |
| 2003/0056217 A1 | 3/2003 | Brooks | |
| 2006/0008256 A1* | 1/2006 | Khedouri | G06Q 20/206 386/234 |
| 2006/0130107 A1 | 6/2006 | Gonder | |
| 2007/0217436 A1 | 9/2007 | Markley | |
| 2009/0248794 A1 | 10/2009 | Helms | |
| 2010/0313236 A1 | 12/2010 | Straub | |
| 2011/0246555 A1* | 10/2011 | Hedges | G11B 27/034 709/203 |
| 2015/0161750 A1* | 6/2015 | Bugir | G06Q 50/184 705/310 |
| 2016/0173556 A1* | 6/2016 | Park | H04N 21/2381 709/219 |
| 2017/0180768 A1* | 6/2017 | Zuccarini | H04N 21/234309 |

OTHER PUBLICATIONS

R. Pantos, Ed. and W. May, Apple Inc., Internet Engineering Task Force (IETF), Nov. 19, 2015, HTTP Live Streaming draft-pantos-http-live-streaming-18. pp. 1-98.

Iraj Sodagar, International Organisation for Standardisation, ISO/IEC JTC1/SC29/WG11, Coding of Moving Pictures and Audio, ISO/IEC JTC1/SC29/WG11 W13533, Apr. 2012, Incheon, KR, Communication Group, White paper on MPEG-DASH Standard, MPEG-DASH: The Standard for Multimedia Streaming Over Internet. pp. 1-6.

Wikipedia, Content delivery network. Downloaded from https://en.wikipedia.org/wiki/Content_delivery_network on Apr. 20, 2016. pp. 1-8.

Wikipedia, Cron. Downloaded from https://en.wikipedia.org/wiki/Cron on May 6, 2016. pp. 1-8.

Wikipedia, Dynamic Adaptive Streaming over HTTP. Downloaded from https://en.wikipedia.org/wiki/Dynamic_Adaptive_Streaming_over_HTTP on Dec. 27, 2015. pp. 1-6.

Wikipedia, HTTP Live Streaming. Downloaded from https://en.wikipedia.org/wiki/HTTP_Live_Streaming on Dec. 27, 2015. pp. 1-12.

Wikipedia, MediaInfo. Downloaded from https://en.wikipedia.org/wiki/MediaInfo on May 6, 2016. pp. 1-3.

MediaInfo, "What is MediaInfo?". Downloaded from http://mediaarea.net/en/MediaInfo on May 6, 2016. pp. 1.

Wikipedia, Ruby (programming language). Downloaded from https://en.wikipedia.org/wiki/Ruby_(programming_language) on Jan. 17, 2016. pp. 1-22.

Wikipedia, RubyGems. Downloaded from https://en.wikipedia.org/wiki/RubyGems on Jan. 17, 2016. pp. 1-3.

Microsoft Silverlight, Silverlight 4 Launch Home. Downloaded from http://www.microsoft.com/silverlight/smoothstreaming/ on Dec. 27, 2015. pp. 1.

Official Microsoft IIS Site, Smooth Streaming. Downloaded from http://www.iis.net/downloads/microsoft/smoothstreaming on Jan. 17, 2016. pp. 1-2.

* cited by examiner

ASYNCHRONOUS WORKFLOWS

FIELD OF THE INVENTION

The present invention relates generally to communications systems and methods, and, more particularly, to intake and/or distribution of video assets in video content networks and the like.

BACKGROUND OF THE INVENTION

Currently, incoming content in a video content network is handled in a linear fashion. A piece of content is brought into the network and is always processed the same way by doing a series of things in a specific order. There may be a variety of intended end products, and it may not be apparent immediately what the end product is supposed to be—for example, the asset could be intended for an ABR (adaptive bit rate video playback) environment, a QAM (quadrature amplitude modulation) plant, and so on, but this will not be apparent until the work flow is ended.

SUMMARY OF THE INVENTION

Principles of the present invention provide techniques for asynchronous workflows. In one aspect, an exemplary method includes assigning at least a first goal to a media asset. Said media asset includes content and metadata. A further step includes, for at least two of a plurality of processes of a workflow engine relevant to said at least first goal, simultaneously polling said media asset from time-to-time to determine whether prerequisites of said at least two of said plurality of processes have been met. An even further step includes, for at least one of said plurality of processes of said workflow engine for which said prerequisites have been met, acting on said media asset to achieve at least a portion of said at least first goal.

In another aspect, another exemplary method includes assigning at least a first goal to a media asset. Said media asset includes content and metadata. A further step includes, for each of a plurality of processes of a workflow engine relevant to said at least first goal, polling said media asset from time-to-time to determine whether prerequisites of each of said plurality of processes have been met. An even further step includes, for at least two of said plurality of processes of said workflow engine for which said prerequisites have been met, simultaneously acting on said media asset to achieve at least a portion of said at least first goal.

In still another aspect, an exemplary apparatus includes a memory, at least one processor coupled to said memory, and a non-transitory persistent storage medium which contains instructions which, when loaded into said memory, configure said at least one processor to be operative to implement a content management system and a workflow engine which orchestrates a plurality of processes, and to assign at least a first goal to a media asset. Said media asset includes content and metadata. The instructions further configure said at least one processor to be operative to, for at least two of said plurality of processes of said workflow engine relevant to said at least first goal, simultaneously poll said media asset from time-to-time to determine whether prerequisites of said at least two of said plurality of processes have been met. The instructions even further configure said at least one processor to be operative to, for at least one of said plurality of processes of said workflow engine for which said prerequisites have been met, act on said media asset to achieve at least a portion of said at least first goal.

In a further aspect, an exemplary apparatus includes a memory, at least one processor coupled to said memory, and a non-transitory persistent storage medium which contains instructions which, when loaded into said memory, configure said at least one processor to be operative to implement a content management system and a workflow engine which orchestrates a plurality of processes, and to assign at least a first goal to a media asset. Said media asset includes content and metadata. The instructions further configure said at least one processor to be operative to, for each of said plurality of processes of said workflow engine relevant to said at least first goal, poll said media asset from time-to-time to determine whether prerequisites of each of said plurality of processes have been met. The instructions even further configure said at least one processor to be operative to, for at least two of said plurality of processes of said workflow engine for which said prerequisites have been met, simultaneously act on said media asset to achieve at least a portion of said at least first goal.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

At least a portion of one or more embodiments of the invention, or elements thereof, can be implemented in the form of an article of manufacture including a machine readable medium that contains one or more programs which when executed implement one or more method steps set forth herein; that is to say, a computer program product including a tangible computer readable recordable storage medium (or multiple such media) with computer usable program code for performing the method steps indicated. Furthermore, at least a portion of one or more embodiments of the invention or elements thereof can be implemented in the form of an apparatus including a memory and at least one processor that is coupled to the memory and operative to perform, or facilitate performance of, exemplary method steps. Yet further, in another aspect, at least a portion of one or more embodiments of the invention or elements thereof can be implemented in the form of means for carrying out one or more of the method steps described herein; the means can include (i) specialized hardware module(s), (ii) software module(s) stored in a tangible computer-readable recordable storage medium (or multiple such media) and implemented on a hardware processor, or (iii) a combination of (i) and (ii); any of (i)-(iii) implement the specific techniques set forth herein. The means do not include a transmission medium per se or a disembodied signal per se.

Techniques of the present invention can provide substantial beneficial technical effects. For example, one or more embodiments provide one or more of:
  enhanced system scalability;
  more rapid provision of content;
  creation of real time metrics and monitoring with a much higher degree of accuracy than in current systems;
  enhanced alerting and reporting on the success and failure of assets as compared to existing linear workflows;
  more efficient and controllable resource management as compared to prior art techniques; and
  more elastic, cloud-based encoding.

These and other features and advantages of the present invention will become apparent from the following detailed description of illustrative embodiments thereof, which is to be read in connection with the accompanying drawings.

DETAILED DESCRIPTION OF PREFERRED EMBODIMENTS

Figure 1:
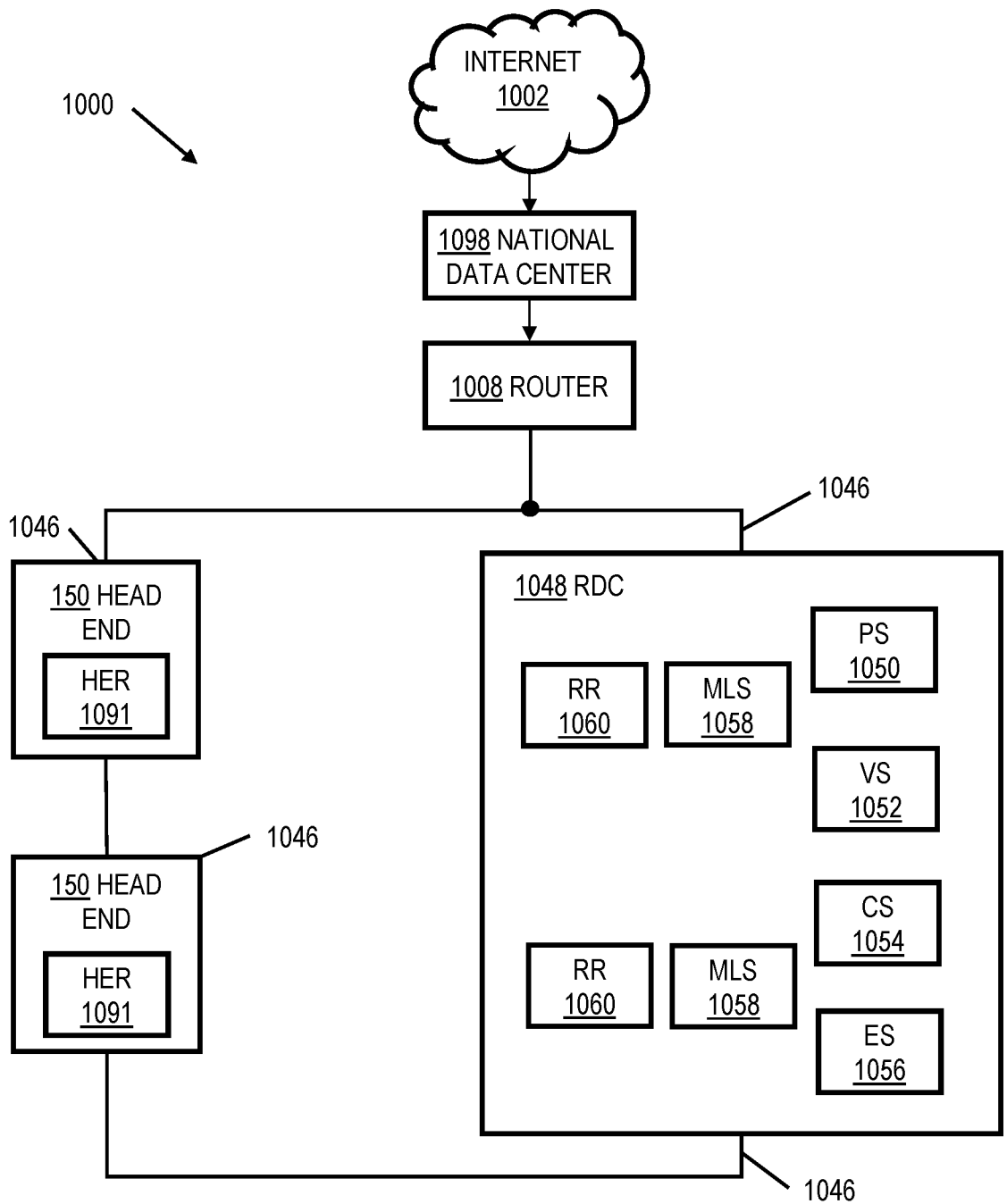
FIG. 1 is a block diagram of an exemplary embodiment of a system, within which one or more aspects of the invention can be implemented.

Purely by way of example and not limitation, some embodiments will be shown in the context of a cable multi-service operator (MSO) providing data services as well as entertainment services, it being understood that in other embodiments, the MSO or similar operator of a video content network might provide video (entertainment) services only. FIG. 1 shows an exemplary system 1000, according to an aspect of the invention. System 1000 includes a regional data center (RDC) 1048, and one or more divisions, represented by division head ends 150. RDC 1048 and head ends 150 are interconnected by a network 1046; by way of example and not limitation, a dense wavelength division multiplex (DWDM) network. Elements 1048, 150 on network 1046 may be operated, for example, by or on behalf of a cable MSO, and may be interconnected with a global system of interconnected computer networks that use the standardized Internet Protocol Suite (TCP/IP)(transfer control protocol/Internet protocol), commonly called the Internet 1002; for example, via router 1008. In one or more non-limiting exemplary embodiments, router 1008 is a point-of-presence ("POP") router; for example, of the kind available from Juniper Networks, Inc., Sunnyvale, Calif., USA.

Head ends 150 may each include a head end router (HER) 1091 which interfaces with network 1046. Head end routers 1091 are omitted from figures below to avoid clutter.

RDC 1048 may include one or more provisioning servers (PS) 1050, one or more Video Servers (VS) 1052, one or more content servers (CS) 1054, and one or more e-mail servers (ES) 1056. The same may be interconnected to one or more RDC routers (RR) 1060 by one or more multi-layer switches (MLS) 1058. RDC routers 1060 interconnect with network 1046.

A national data center (NDC) 1098 is provided in some instances; for example, between router 1008 and Internet 1002. In one or more embodiments, such an NDC may consolidate at least some functionality from head ends and/or regional data centers. For example, such an NDC might include one or more VOD servers; switched digital video (SDV) functionality; gateways to obtain content (e.g., program content) from various sources including cable feeds and/or satellite; and so on.

Furthermore, there may be multiple (e.g., two) national data centers and many regional data centers; only one of each is shown to avoid cluttering the drawings.

Figure 2:
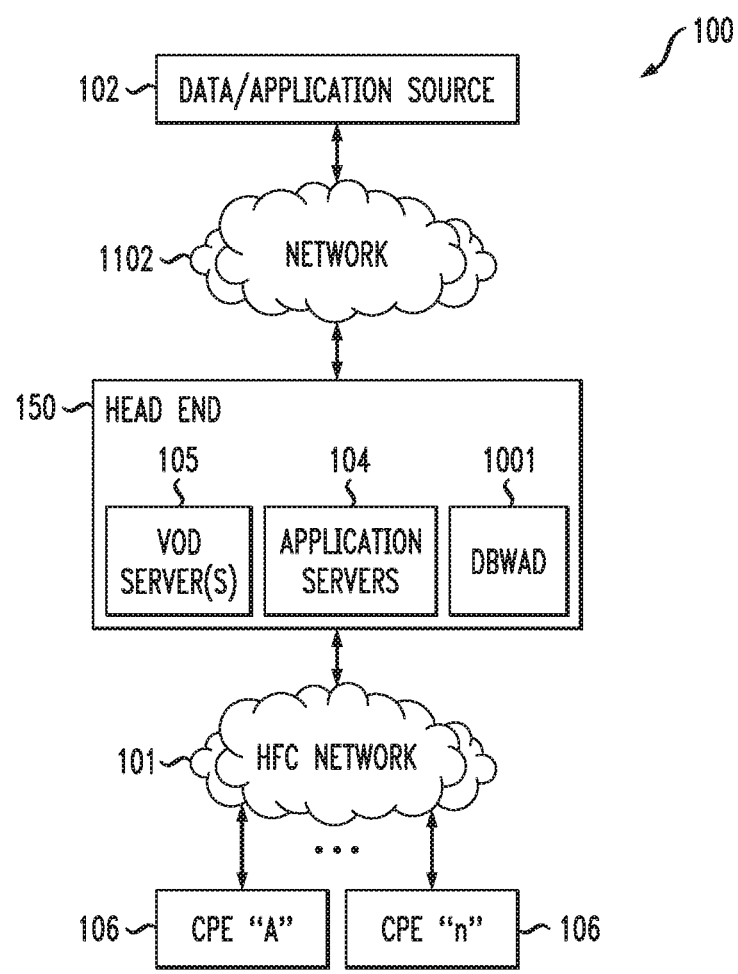
FIG. 2 is a functional block diagram illustrating an exemplary hybrid fiber-coaxial (HFC) divisional network configuration, useful within the system of FIG. 1.

FIG. 2 is a functional block diagram illustrating an exemplary content-based (e.g., hybrid fiber-coaxial (HFC)) divisional network configuration, useful within the system of FIG. 1. See, for example, US Patent Publication 2006/0130107 of Gonder et al., entitled "Method and apparatus for high bandwidth data transmission in content-based networks," the complete disclosure of which is expressly incorporated by reference herein in its entirety for all purposes. The various components of the network 100 include (i) one or more data and application origination points 102; (ii) one or more application distribution servers 104; (iii) one or more video-on-demand (VOD) servers 105, and (v) consumer premises equipment or customer premises equipment (CPE) 106. The distribution server(s) 104, VOD servers 105 and CPE(s) 106 are connected via a bearer (e.g., HFC) network 101. Servers 104, 105 can be located in head end 150. A simple architecture is shown in FIG. 2 for illustrative brevity, although it will be recognized that comparable architectures with multiple origination points, distribution servers, VOD servers, and/or CPE devices (as well as different network topologies) may be utilized consistent with embodiments of the invention. For example, the head-end architecture of FIG. 3 (described in greater detail below) may be used.

The data/application origination point 102 comprises any medium that allows data and/or applications (such as a VOD-based or "Watch TV" application) to be transferred to a distribution server 104, for example, over network 1102. This can include for example a third party data source, application vendor website, compact disk read-only memory (CD-ROM), external network interface, mass storage device (e.g., Redundant Arrays of Inexpensive Disks (RAID) system), etc. Such transference may be automatic, initiated upon the occurrence of one or more specified events (such as the receipt of a request packet or acknowledgement (ACK)), performed manually, or accomplished in any number of other modes readily recognized by those of ordinary skill, given the teachings herein. For example, in one or more embodiments, network 1102 may correspond to network 1046 of FIG. 1, and the data and application origination point may be, for example, within NDC 1098, RDC 1048, or on the Internet 1002. Head end 150, HFC network 101, and CPEs 106 thus represent the divisions which were represented by division head ends 150 in FIG. 1.

The application distribution server 104 comprises a computer system where such applications can enter the network system. Distribution servers per se are well known in the networking arts, and accordingly not described further herein.

The VOD server 105 comprises a computer system where on-demand content can be received from one or more of the aforementioned data sources 102 and enter the network system. These servers may generate the content locally, or alternatively act as a gateway or intermediary from a distant source.

The CPE 106 includes any equipment in the "customers' premises" (or other appropriate locations) that can be accessed by a distribution server 104 or a cable modem termination system 156 (discussed below with regard to FIG. 3). Non-limiting examples of CPE are set-top boxes and high-speed cable modems for providing high bandwidth Internet access in premises such as homes and businesses.

Also included (for example, in head end 150) is a dynamic bandwidth allocation device (DBWAD) 1001 such as a global session resource manager, which is itself a non-limiting example of a session resource manager.

Figure 3:
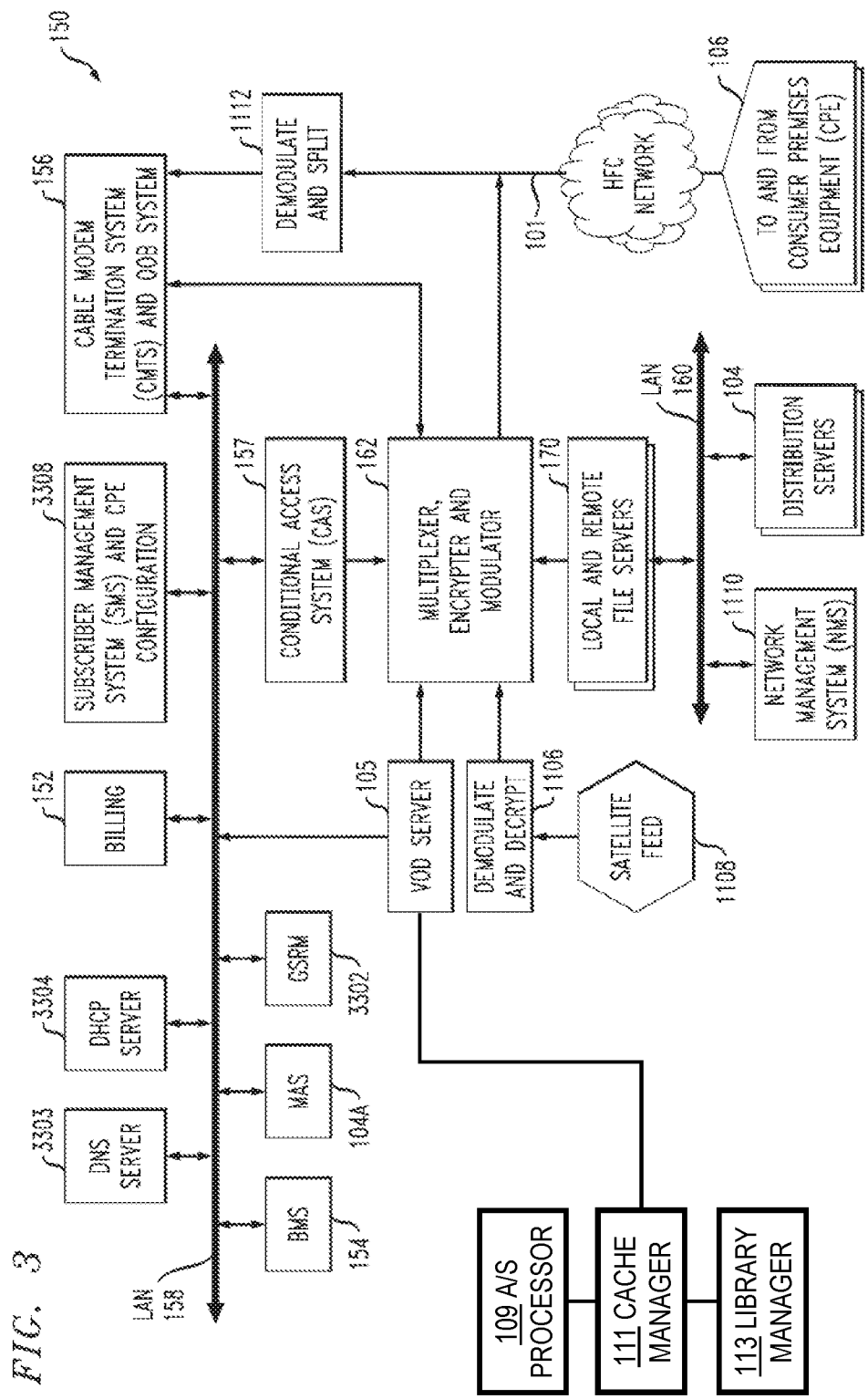
FIG. 3 is a functional block diagram illustrating one exemplary HFC cable network head-end configuration, useful within the system of FIG. 1.

FIG. 3 is a functional block diagram illustrating one exemplary HFC cable network head-end configuration, useful within the system of FIG. 1. As shown in FIG. 3, the head-end architecture 150 comprises typical head-end components and services including billing module 152, subscriber management system (SMS) and CPE configuration management module 3308, cable-modem termination system (CMTS) and out-of-band (OOB) system 156, as well as LAN(s) 158, 160 placing the various components in data communication with one another. In one or more embodiments, there are multiple CMTSs. Each may be coupled to an HER 1091, for example. See, e.g., FIGS. 1 and 2 of co-assigned U.S. Pat. No. 7,792,963 of inventors Gould and Danforth, entitled METHOD TO BLOCK UNAUTHORIZED NETWORK TRAFFIC IN A CABLE DATA NETWORK, the complete disclosure of which is expressly incorporated herein by reference in its entirety for all purposes.

It will be appreciated that while a bar or bus LAN topology is illustrated, any number of other arrangements (e.g., ring, star, etc.) may be used consistent with the invention. It will also be appreciated that the head-end configuration depicted in FIG. 3 is high-level, conceptual architecture and that each multi-service operator (MSO) may have multiple head-ends deployed using custom architectures.

The architecture 150 of FIG. 3 further includes a multiplexer/encrypter/modulator (MEM) 162 coupled to the HFC network 101 adapted to "condition" content for transmission over the network. The distribution servers 104 are coupled to the LAN 160, which provides access to the MEM 162 and network 101 via one or more file servers 170. The VOD servers 105 are coupled to the LAN 158, although other architectures may be employed (such as for example where the VOD servers are associated with a core switching device such as an 802.3z Gigabit Ethernet device; or the VOD servers could be coupled to LAN 160). Since information is typically carried across multiple channels, the head-end should be adapted to acquire the information for the carried channels from various sources. Typically, the channels being delivered from the head-end 150 to the CPE 106 ("downstream") are multiplexed together in the head-end and sent to neighborhood hubs (refer to description of FIG. 4) via a variety of interposed network components.

Content (e.g., audio, video, etc.) is provided in each downstream (in-band) channel associated with the relevant service group. (Note that in the context of data communications, internet data is passed both downstream and upstream.) To communicate with the head-end or intermediary node (e.g., hub server), the CPE 106 may use the out-of-band (OOB) or DOCSIS® (Data Over Cable Service Interface Specification) channels (registered mark of Cable Television Laboratories, Inc., 400 Centennial Parkway Louisville Colo. 80027, USA) and associated protocols (e.g., DOCSIS 1.x, 2.0, 3.0, or 3.1). The OpenCable™ Application Platform (OCAP) 1.0, 2.0, 3.0 (and subsequent) specification (Cable Television laboratories Inc.) provides for exemplary networking protocols both downstream and upstream, although the invention is in no way limited to these approaches. All versions of the DOCSIS and OCAP specifications are expressly incorporated herein by reference in their entireties for all purposes.

Furthermore in this regard, DOCSIS is an international telecommunications standard that permits the addition of high-speed data transfer to an existing cable TV (CATV) system. It is employed by many cable television operators to provide Internet access (cable Internet) over their existing hybrid fiber-coaxial (HFC) infrastructure. It will also be recognized that multiple servers (broadcast, VOD, or otherwise) can be used, and disposed at two or more different locations if desired, such as being part of different server "farms". These multiple servers can be used to feed one service group, or alternatively different service groups. In a simple architecture, a single server is used to feed one or more service groups. In another variant, multiple servers located at the same location are used to feed one or more service groups. In yet another variant, multiple servers disposed at different location are used to feed one or more service groups.

In some instances, material may also be obtained from a satellite feed 1108; such material is demodulated and decrypted in block 1106 and fed to block 162. Conditional access system 157 may be provided for access control purposes. Network management system 1110 may provide appropriate management functions. Note also that signals from MEM 162 and upstream signals from network 101 that have been demodulated and split in block 1112 are fed to CMTS and OOB system 156.

Also included in FIG. 3 are a global session resource manager (GSRM) 3302, a Mystro Application Server 104A, and a business management system 154, all of which are coupled to LAN 158. GSRM 3302 is one specific form of a DBWAD 1001 and is a non-limiting example of a session resource manager.

An ISP DNS server could be located in the head-end as shown at 3303, but it can also be located in a variety of other places. One or more DHCP server(s) 3304 can also be located where shown or in different locations.

Figure 4:
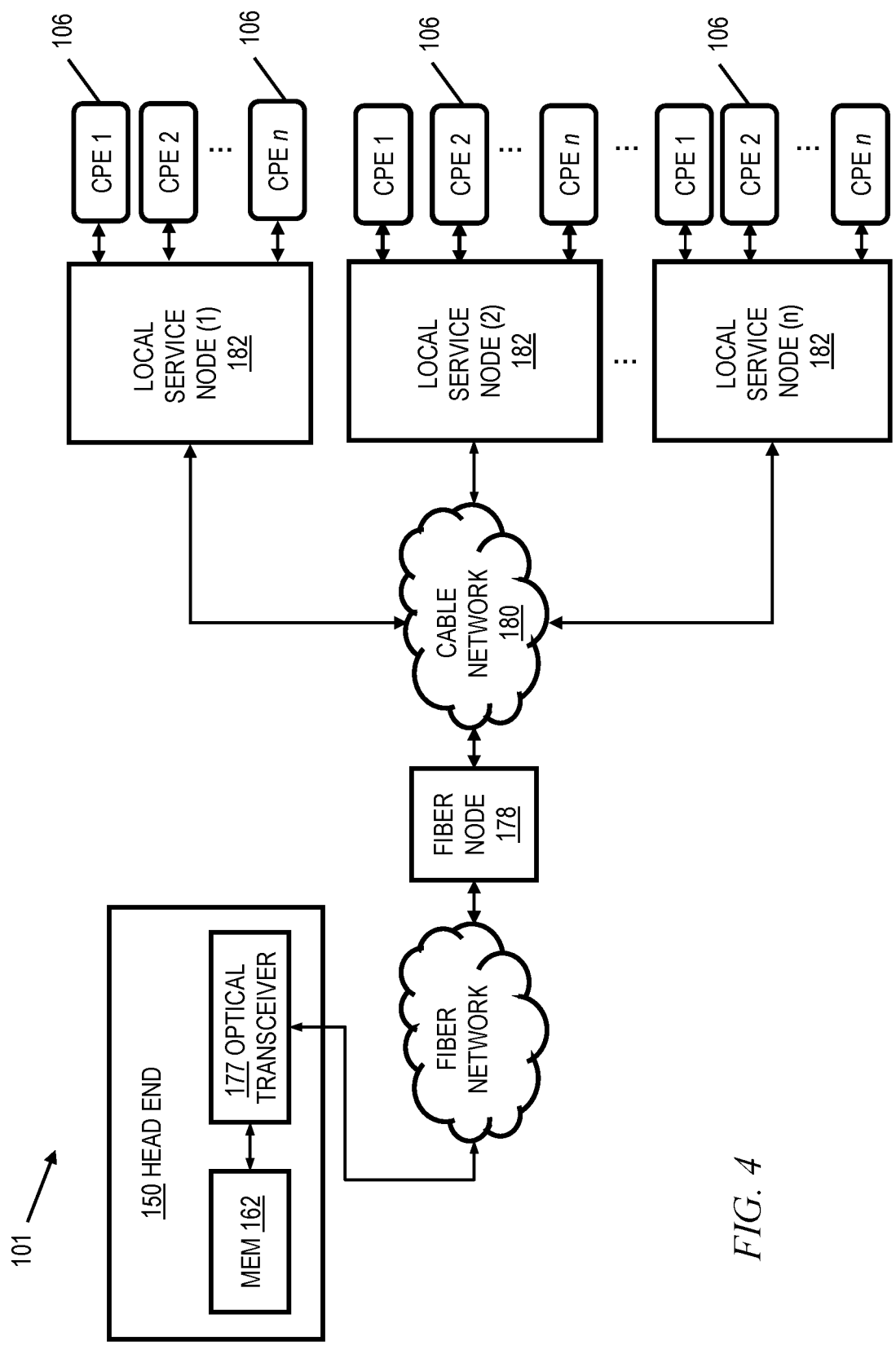
FIG. 4 is a functional block diagram illustrating one exemplary local service node configuration useful within the system of FIG. 1.

As shown in FIG. 4, the network 101 of FIGS. 2 and 3 comprises a fiber/coax arrangement wherein the output of the MEM 162 of FIG. 3 is transferred to the optical domain (such as via an optical transceiver 177 at the head-end 150 or further downstream). The optical domain signals are then distributed over a fiber network to a fiber node 178, which further distributes the signals over a distribution network 180 (typically coax) to a plurality of local servicing nodes 182. This provides an effective 1-to-N expansion of the network at the local service end. Each node 182 services a number of CPEs 106. Further reference may be had to US Patent Publication 2007/0217436 of Markley et al., entitled "Methods and apparatus for centralized content and data delivery," the complete disclosure of which is expressly incorporated herein by reference in its entirety for all purposes. In one or more embodiments, the CPE 106 includes a cable modem, such as a DOCSIS-compliant cable modem (DCCM). Please note that the number of CPE 106 per node 182 may be different than the number of nodes 182.

A video (or other) content network that also delivers data is but one non-limiting example of a context where one or more embodiments could be implemented. US Patent Publication 2003-0056217 of Paul D. Brooks, entitled "Technique for Effectively Providing Program Material in a Cable Television System," the complete disclosure of which is expressly incorporated herein by reference for all purposes, describes one exemplary broadcast switched digital architecture, although it will be recognized by those of ordinary skill that other approaches and architectures may be substituted. In a cable television system in accordance with the Brooks invention, program materials are made available to subscribers in a neighborhood on an as needed basis. Specifically, when a subscriber at a set-top terminal selects a program channel to watch, the selection request is transmitted to a head end of the system. In response to such a request, a controller in the head end determines whether the material of the selected program channel has been made available to the neighborhood. If it has been made available, the controller identifies to the set-top terminal the carrier which is carrying the requested program material, and to which the set-top terminal tunes to obtain the requested program material. Otherwise, the controller assigns an unused carrier to carry the requested program material, and informs the set-top terminal of the identity of the newly assigned carrier. The controller also retires those carriers assigned for the program channels which are no longer watched by the subscribers in the neighborhood. Note that reference is made herein, for brevity, to features of the "Brooks invention"—it should be understood that no inference should be drawn that such features are necessarily present in all claimed embodiments of Brooks. The Brooks invention is directed to a technique for utilizing limited network bandwidth to distribute program materials to subscribers in a community access television (CATV) system. In accordance with the Brooks invention, the CATV system makes available to subscribers selected program channels, as opposed to all of the program channels furnished by the system as in prior art. In the Brooks CATV system, the program channels are provided on an as needed basis, and are selected to serve the subscribers in the same neighborhood requesting those channels.

US Patent Publication 2010-0313236 of Albert Straub, entitled "TECHNIQUES FOR UPGRADING SOFTWARE IN A VIDEO CONTENT NETWORK," the complete disclosure of which is expressly incorporated herein by reference for all purposes, provides additional details on the aforementioned dynamic bandwidth allocation device 1001.

US Patent Publication 2009-0248794 of William L. Helms, entitled "SYSTEM AND METHOD FOR CONTENT SHARING," the complete disclosure of which is expressly incorporated herein by reference for all purposes, provides additional details on CPE in the form of a converged premises gateway device. Related aspects are also disclosed in US Patent Publication 2007-0217436 of Markley et al, entitled "METHODS AND APPARATUS FOR CENTRALIZED CONTENT AND DATA DELIVERY," the complete disclosure of which is expressly incorporated herein by reference for all purposes.

It is worth noting that, until fairly recently, the cable network was predominantly a vehicle for delivering entertainment. With the advent of the Internet and the rise in demand for broadband two-way access, the cable industry began to seek new ways of utilizing its existing plant. Pure coaxial ("coax") cable networks were replaced with hybrid fiber networks (HFNs) using optical fiber from the head end to the demarcation with the subscriber coax (usually at a fiber node). Currently, a content-based network, a non-limiting example of which is a cable television network, may afford access to a variety of services besides television, for example, broadband Internet access, telephone service, and the like. However, as noted, some embodiments could be employed with networks that are limited to providing video content.

One significant issue for a cable operator desiring to provide digital service is the configuration of its network. Designed for one-way delivery of broadcast signals, the existing cable network topology was optimized for downstream only (i.e., towards the subscriber) service. New equipment had to be added to the network to provide two-way communication. To reduce the cost of this equipment and to simplify the upgrade of the broadcast cable for two-way digital traffic, standards were developed for a variety of new cable-based services. The first of these standards, the aforementioned Data Over Cable System Interface Standard (DOCSIS® standard), was released in 1998. DOCSIS® establishes standards for cable modems and supporting equipment. DOCSIS® (Data Over Cable Service Interface Specification) is a registered mark of Cable Television Laboratories, Inc., 400 Centennial Parkway Louisville Colo. 80027, USA, and may be referred to in this application in capital letters, without the ® symbol, for convenience.

Figure 5:
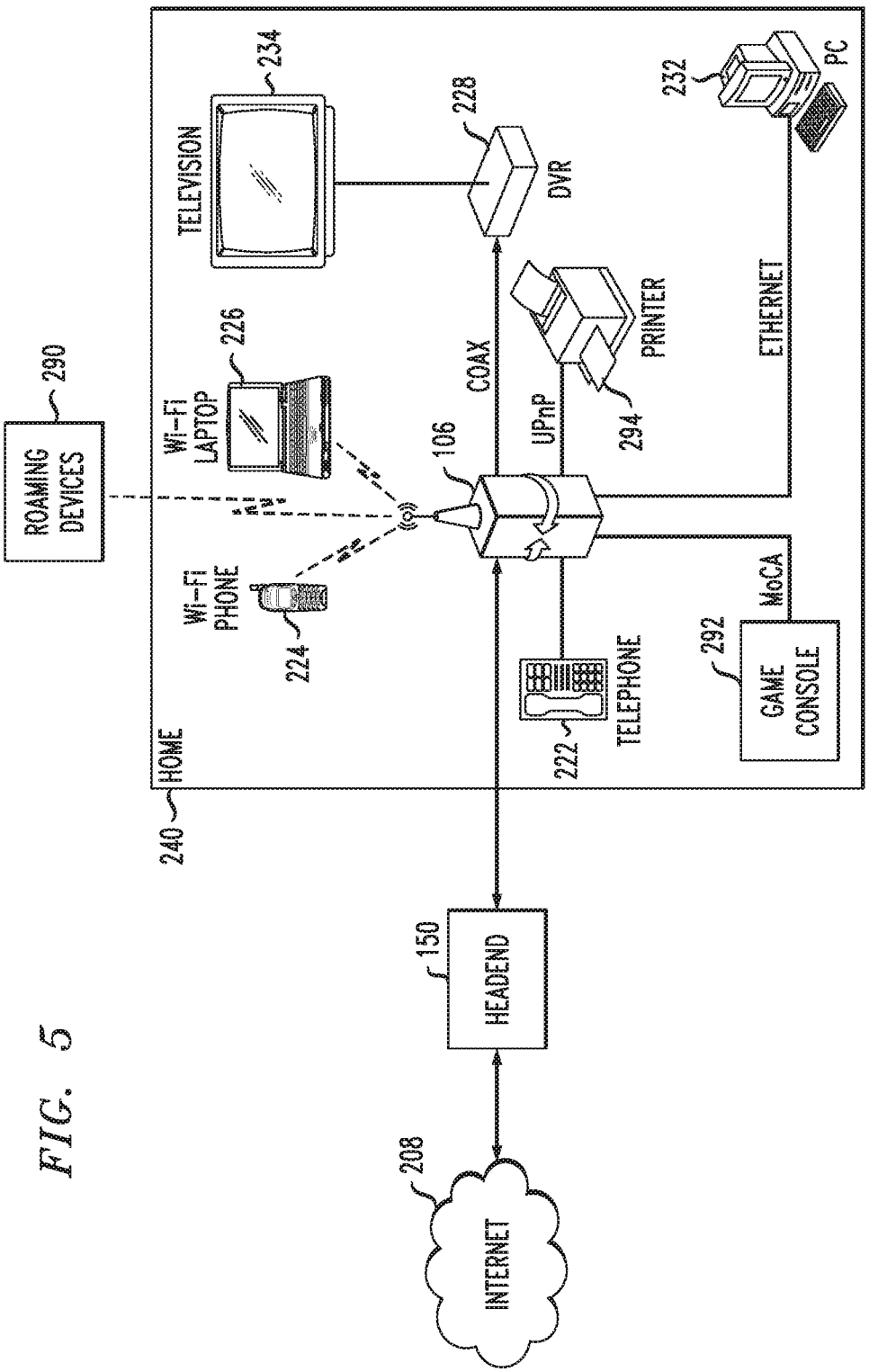
FIG. 5 is a functional block diagram of a premises network, including an exemplary centralized customer premises equipment (CPE) unit, interfacing with a head end such as that of FIG. 3.
Figure 6:
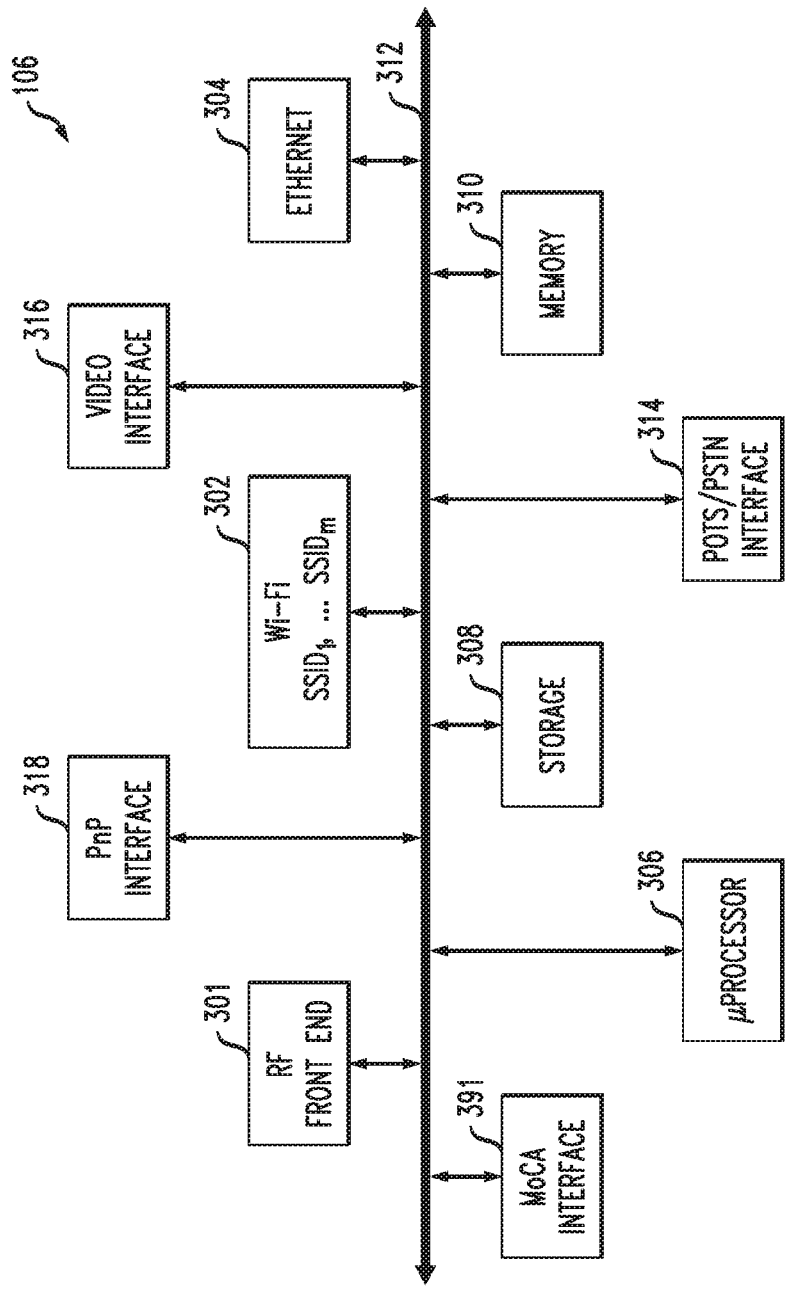
FIG. 6 is a functional block diagram of an exemplary centralized CPE unit, useful within the system of FIG. 1.

Reference should now be had to FIG. 5, which presents a block diagram of a premises network interfacing with a head end of an MSO or the like, providing Internet access. An exemplary advanced wireless gateway comprising CPE 106 is depicted as well. It is to be emphasized that the specific form of CPE 106 shown in FIGS. 5 and 6 is exemplary and non-limiting, and shows a number of optional features. Many other types of CPE can be employed; for example, a DOC SIS cable modem with or without the other functionality depicted in FIGS. 5 and 6, DSL modem, "plain vanilla" set-top terminal, and the like.

Exemplary CPE 106 includes an advanced wireless gateway which connects to a head end 150 or other hub of a network, such as a video content network of an MSO or the like. The head end is coupled also to an internet (e.g., the Internet) 208 which is located external to the head end 150, such as via an Internet (IP) backbone or gateway (not shown).

The head end is in the illustrated embodiment coupled to multiple households or other premises, including the exemplary illustrated household 240. In particular, the head end (for example, a cable modem termination system 156 thereof) is coupled via the aforementioned HFC network and local coaxial cable or fiber drop to the premises, including the consumer premises equipment (CPE) 106. The exemplary CPE 106 is in signal communication with any number of different devices including, e.g., a wired telephony unit 222, a Wi-Fi or other wireless-enabled phone 224, a Wi-Fi or other wireless-enabled laptop 226, a session initiation protocol (SIP) phone, an H.323 terminal or gateway, etc. Additionally, the CPE 106 is also coupled to a digital video recorder (DVR) 228 (e.g., over coax), in turn coupled to television 234 via a wired or wireless interface (e.g., cabling, PAN or 802.15 UWB micro-net, etc.). CPE 106 is also in communication with a network (here, an Ethernet network compliant with IEEE Std. 802.3, although any number of other network protocols and topologies could be used) on which is a personal computer (PC) 232.

Other non-limiting exemplary devices that CPE 106 may communicate with include a printer 294; for example over a universal plug and play (UPnP) interface, and/or a game console 292; for example, over a multimedia over coax alliance (MoCA) interface.

In some instances, CPE 106 is also in signal communication with one or more roaming devices, generally represented by block 290.

A "home LAN" (HLAN) is created in the exemplary embodiment, which may include for example the network formed over the installed coaxial cabling in the premises, the Wi-Fi network, and so forth.

During operation, the CPE 106 exchanges signals with the head end over the interposed coax (and/or other, e.g., fiber) bearer medium. The signals include e.g., Internet traffic (IPv4 or IPv6), digital programming and other digital signaling or content such as digital (packet-based; e.g., VoIP) telephone service. The CPE 106 then exchanges this digital information after demodulation and any decryption (and any demultiplexing) to the particular system(s) to which it is directed or addressed. For example, in some cases, a MAC address or IP address can be used as the basis of directing traffic within the client-side environment 240.

Any number of different data flows may occur within the network depicted in FIG. 5. For example, the CPE 106 may exchange digital telephone signals from the head end which are further exchanged with the telephone unit 222, the Wi-Fi phone 224, or one or more roaming devices 290. The digital telephone signals may be IP-based such as Voice-over-IP (VoIP), or may utilize another protocol or transport mechanism. The well known session initiation protocol (SIP) may be used, for example, in the context of a "SIP phone" for making multi-media calls. The network may also interface with a cellular or other wireless system, such as for example a 3G IMS (IP multimedia subsystem) system, in order to provide multimedia calls between a user or consumer in the household domain 240 (e.g., using a SIP phone or H.323 terminal) and a mobile 3G telephone or personal media device (PMD) user via that user's radio access network (RAN).

The CPE 106 may also exchange Internet traffic (e.g., TCP/IP and other packets) with the head end 150 which is further exchanged with the Wi-Fi laptop 226, the PC 232, one or more roaming devices 290, or other device. CPE 106 may also receive digital programming that is forwarded to the DVR 228 or to the television 234. Programming requests and other control information may be received by the CPE 106 and forwarded to the head end as well for appropriate handling.

FIG. 6 is a block diagram of one exemplary embodiment of the CPE 106 of FIG. 5. The exemplary CPE 106 includes an RF front end 301, Wi-Fi interface 302, video interface 316, "Plug n' Play" (PnP) interface 318 (for example, a UPnP interface) and Ethernet interface 304, each directly or indirectly coupled to a bus 312. In some cases, Wi-Fi interface 302 comprises a single wireless access point (WAP) running multiple ("m") service set identifiers (SSIDs). In some cases, multiple SSIDs, which could represent different applications, are served from a common WAP. For example, SSID 1 is for the home user, while SSID 2 may be for a managed security service, SSID 3 may be a managed home networking service, SSID 4 may be a hot spot, and so on. Each of these is on a separate IP subnetwork for security, accounting, and policy reasons. The microprocessor 306, storage unit 308, plain old telephone service (POTS)/public switched telephone network (PSTN) interface 314, and memory unit 310 are also coupled to the exemplary bus 312, as is a suitable MoCA interface 391. The memory unit 310 typically comprises a random access memory (RAM) and storage unit 308 typically comprises a hard disk drive, an optical drive (e.g., CD-ROM or DVD), NAND flash memory, RAID (redundant array of inexpensive disks) configuration, or some combination thereof.

The illustrated CPE 106 can assume literally any discrete form factor, including those adapted for desktop, floor-standing, or wall-mounted use, or alternatively may be integrated in whole or part (e.g., on a common functional basis) with other devices if desired.

Again, it is to be emphasized that every embodiment need not necessarily have all the elements shown in FIG. 6—as noted, the specific form of CPE 106 shown in FIGS. 5 and 6 is exemplary and non-limiting, and shows a number of optional features. Yet again, many other types of CPE can be employed; for example, a cable modem, DSL modem, and the like. Indeed, one or more embodiments are applicable to any system and/or service that can consume video; this includes, for example, the QAM environment and all IP environments. Since speed is typically a feature of the encoding settings, one or more embodiments are applicable regardless of speed.

It will be recognized that while a linear or centralized bus architecture is shown as the basis of the exemplary embodiment of FIG. 6, other bus architectures and topologies may be used. For example, a distributed or multi-stage bus architecture may be employed. Similarly, a "fabric" or other mechanism (e.g., crossbar switch, RAPIDIO interface, non-blocking matrix, TDMA or multiplexed system, etc.) may be used as the basis of at least some of the internal bus communications within the device. Furthermore, many if not all of the foregoing functions may be integrated into one or more integrated circuit (IC) devices in the form of an ASIC (application specific integrated circuit), FPGA (field programmable gate array), or "system-on-a-chip" (SoC). Myriad other architectures well known to those in the data processing and computer arts may accordingly be employed.

Yet again, it will also be recognized that the CPE configuration shown is essentially for illustrative purposes, and various other configurations of the CPE 106 are possible. For example, the CPE 106 in FIG. 6 may not include all of the elements shown, and/or may include additional elements and interfaces such as for example an interface for the HomePlug A/V standard which transmits digital data over power lines, a PAN (e.g., 802.15), Bluetooth, or other short-range wireless interface for localized data communication, etc.

A suitable number of standard 10/100/1000 Base T Ethernet ports for the purpose of a Home LAN connection are provided in the exemplary device of FIG. 6; however, it will be appreciated that other rates (e.g., Gigabit Ethernet or 10-Gig-E) and local networking protocols (e.g., MoCA, USB, etc.) may be used. These interfaces may be serviced via a WLAN interface, wired RJ-45 ports, or otherwise. The CPE 106 can also include a plurality of RJ-11 ports for telephony interface, as well as a plurality of USB (e.g., USB 2.0) ports, and IEEE-1394 (Firewire) ports. S-video and other signal interfaces may also be provided if desired.

During operation of the CPE 106, software located in the storage unit 308 is run on the microprocessor 306 using the memory unit 310 (e.g., a program memory within or external to the microprocessor). The software controls the operation of the other components of the system, and provides various other functions within the CPE. Other system software/firmware may also be externally reprogrammed, such as using a download and reprogramming of the contents of the flash memory, replacement of files on the storage device or within other non-volatile storage, etc. This allows for remote reprogramming or reconfiguration of the CPE 106 by the MSO or other network agent.

The RF front end 301 of the exemplary embodiment comprises a cable modem of the type known in the art. In some cases, the CPE just includes the cable modem and omits one or more of the other features. Content or data normally streamed over the cable modem can be received and distributed by the CPE 106, such as for example packetized video (e.g., IPTV). The digital data exchanged using RF front end 301 includes IP or other packetized protocol traffic that provides access to internet service. As is well known in cable modem technology, such data may be streamed over one or more dedicated QAMs resident on the HFC bearer medium, or even multiplexed or otherwise combined with QAMs allocated for content delivery, etc. The packetized (e.g., IP) traffic received by the CPE 106 may then be exchanged with other digital systems in the local environment 240 (or outside this environment by way of a gateway or portal) via, e.g. the Wi-Fi interface 302, Ethernet interface 304 or plug-and-play (PnP) interface 318.

Additionally, the RF front end 301 modulates, encrypts/multiplexes as required, and transmits digital information for receipt by upstream entities such as the CMTS or a network server. Digital data transmitted via the RF front end 301 may include, for example, MPEG-2 encoded programming data that is forwarded to a television monitor via the video interface 316. Programming data may also be stored on the CPE storage unit 308 for later distribution by way of the video interface 316, or using the Wi-Fi interface 302, Ethernet interface 304, Firewire (IEEE Std 1394), USB/USB2, or any number of other such options.

Other devices such as portable music players (e.g., MP3 audio players) may be coupled to the CPE 106 via any number of different interfaces, and music and other media files downloaded for portable use and viewing.

In some instances, the CPE 106 includes a DOCSIS cable modem for delivery of traditional broadband Internet services. This connection can be shared by all Internet devices in the premises 240; e.g. Internet protocol television (IPTV) devices, PCs, laptops, etc., as well as by roaming devices 290. In addition, the CPE 106 can be remotely managed (such as from the head end 150, or another remote network agent) to support appropriate IP services.

In some instances the CPE 106 also creates a home Local Area Network (LAN) utilizing the existing coaxial cable in the home. For example, an Ethernet-over-coax based technology allows services to be delivered to other devices in the home utilizing a frequency outside (e.g., above) the traditional cable service delivery frequencies. For example, frequencies on the order of 1150 MHz could be used to deliver data and applications to other devices in the home such as PCs, PMDs, media extenders and set-top boxes. The coaxial network is merely the bearer; devices on the network utilize Ethernet or other comparable networking protocols over this bearer.

The exemplary CPE 106 shown in FIGS. 5 and 6 acts as a Wi-Fi access point (AP), thereby allowing Wi-Fi enabled devices to connect to the home network and access Internet, media, and other resources on the network. This functionality can be omitted in one or more embodiments.

In one embodiment, Wi-Fi interface 302 comprises a single wireless access point (WAP) running multiple ("m") service set identifiers (SSIDs). One or more SSIDs can be set aside for the home network while one or more SSIDs can be set aside for roaming devices 290.

A premises gateway software management package (application) is also provided to control, configure, monitor and provision the CPE 106 from the cable head-end 150 or other remote network node via the cable modem (DOCSIS) interface. This control allows a remote user to configure and monitor the CPE 106 and home network.

The MoCA interface 391 can be configured, for example, in accordance with the MoCA 1.0, 1.1, or 2.0 specifications.

As discussed above, the optional Wi-Fi wireless interface 302 is, in some instances, also configured to provide a plurality of unique service set identifiers (SSIDs) simultaneously. These SSIDs are configurable (locally or remotely), such as via a web page.

In addition to "broadcast" content (e.g., video programming), the systems of FIGS. 1-6 also deliver Internet data services using the Internet protocol (IP), although other protocols and transport mechanisms of the type well known in the digital communication art may be substituted. The IP packets are typically transmitted on RF channels that are different that the RF channels used for the broadcast video and audio programming, although this is not a requirement. The CPE 106 are each configured to monitor the particular assigned RF channel (such as via a port or socket ID/address, or other such mechanism) for IP packets intended for the subscriber premises/address that they serve. Again, Internet data services may not be provided in some embodiments.

It should be noted that one or more embodiments are generally applicable in, for example, the classic QAM environment and the IP environment. At least some embodiments can be employed in the context of a content delivery network or content distribution network (CDN), and or via applications such as the TWC TV® app (registered mark of Time Warner Inc., New York, N.Y.) for mobile devices which permits the consumption of television programming on such devices. Accordingly, embodiments provided within the context of the classic QAM environment are exemplary and non-limiting. Reference is made to the following US Patents, each of which is expressly incorporated herein by reference herein in its entirety, for all purposes:

Hasek, et al., U.S. Pat. No. 8,181,209—Methods and apparatus for providing video on demand and network PVR functions using IP streaming Lajoie, et al., U.S. Pat. No. 8,516,529—Methods and apparatus for packetized content delivery over a content delivery network.

FIG. 3 also shows components associated with intake of program assets, which may be located in head end 150 as shown, or in NDC 1098 and/or RDC 1048. Programs and services are received from various providers and sources, e.g., analog and digital satellite sources, application servers, media servers, the Internet, and the like. Analog and digital satellite sources typically provide the traditional forms of television broadcast programs and information services. Application servers typically provide executable code and data for application specific services such as database services, network management services, transactional electronic commerce services, system administration console services, other application specific services (such as stock ticker, sports ticker, weather and interactive program guide data), resource management services, connection management services, subscriber care services, billing services, operation system services, and object management services. Media servers provide time-critical media assets such as MPEG-2 encoded video and audio, MPEG-2 encoded still images, bit-mapped graphic images, Pulse Code Modulation (PCM) digital audio, three dimensional graphic objects, application programs, application data files, etc. Although specific examples of programs and services which may be provided by the aforementioned sources are given herein, other programs and services may also be provided by these or other sources.

Acquisition/Staging (A/S) processor 109 processes program materials including, e.g., TV program streams, from one or more of the aforementioned sources in analog and/or digital forms (e.g., processor 109 could receive material from satellite feed 1108). Analog TV program streams may be formatted according to the National Television Standards Committee (NTSC) or Phase Alternating Line (PAL) broadcast standard. Digital TV streams may be formatted according to the Digital Video Broadcasting (DVB), Society of Cable Telecommunications Engineers (SCTE), or Advanced Television Systems Committee (ATSC) standards. Processor 109, among other things, extracts program content in the analog and/or digital TV streams and reformats the content to form one or more MPEG-2 encoded transport streams. Such reformatting may even be applied to those received streams already in an MPEG-2 format. This stems from the fact that the digital content in the received MPEG-2 streams is typically encoded at a variable bit rate (VBR). To avoid data "burstiness," processor 109 in a conventional manner re-encodes such digital content at a constant bit rate (CBR) to form the aforementioned transport streams.

An MPEG-2 transport stream contains multiple program streams with different video and audio feeds multiplexed for transmission through the same transmission channel. The program streams representing individual programs are identified by respective program identifications (IDs) within a transport stream. It should be noted at this point that the term "transmission channel" should not be confused with a "program channel." A "transmission channel" signifies a designated frequency band through which a transport stream is transmitted. On the other hand, a "program channel" signifies the source of the program material selected by a user to view. For example, a user may select program channel 2 to view program material provided by CBS, program channel 23 to view program material provided by Home Box Office (HBO); program channel 32 to view program material provided by Music Television (MTV), and so on. At this juncture, it should be noted that compression techniques other than MPEG-2 may be employed.

In this illustrative embodiment, the transmission channels, each carrying a transport stream, may be 6 MHz bands populating a forward passband, e.g., a 350-750 MHz band, of a coaxial cable, which is allocated for downstream communication from head-end 150 to a given set-top terminal 106.

A/S processor 109 may receive "assets" including pre-staged movie videos, news reports, sports events, etc. from content providers. However, processor 109 may also create "assets" in real time while processing received program materials which are not pre-staged by the content providers. In general, an "asset" is a container and/or reference for any object or set of objects that may be desired in order to implement a service, including video, audio, images, application executables, scripts, configuration files, text, fonts, and hypertext mark-up language (HTML) pages (or pointers referencing their storage locations). In addition to the raw content, metadata is also a part of an asset object that describes characteristics of the asset. For example, asset metadata may describe attributes that are inherent in the content of the asset, such as the rating, format, duration, size, or encoding method. Values for asset metadata are typically determined at the time the asset is created, but can also be determined before such time and then populated into appropriate locations when the asset is created.

An asset concerning a program may, in some instances, include trick files associated with the program as well, to support fast forward and rewind.

A typical program is interrupted by commercials. Thus, the program content may include show segments interleaved with commercial segments. The TV program streams received by processor 109 are pre-processed, e.g., by the providers, to include sensible flags (indicators), such as, for example, cue-tones, on which processor 109 relies to identify the demarcations (or edges) of different programs and program segments within each program. Thus, before processor 109 processes the TV program stream containing a certain TV program, it may note that a first cue-tone has been inserted at the beginning of a first segment, indicating the beginning of the TV program; second cue-tones have been inserted at the beginnings of other segments, indicating the beginnings of the respective commercial segments; third cue-tones have been inserted at the ends of other segments, indicating the ends of the respective commercial segments; and a fourth cue-tone has been inserted at the end of the final segment, indicating the end of the TV program. Another set of cue-tones may be inserted to delimit a "chapter" within a program. A chapter is a self-contained subprogram, e.g., a skit, monolog, song performance, news report, weather report, etc. within a program. With the cue-tones defining one such chapter, processor 109 is capable of identifying the chapter and creating an asset concerning the same.

Consider a TV program that is an initial broadcast program. Processor 109, among other things, collects in a database (not explicitly called out) program guide data associated with different TV programs which are not pre-staged (including this TV program) from an application server, which may be different from the sources of the TV programs themselves. Each program when presented to processor 109 is identified by a program designation, which may be used to locate the corresponding program guide data. In particular, processor 109, while processing the TV program, may locate the corresponding program guide data to create, in real time, the metadata file associated with the TV program. The metadata file thus created includes such data as the title, the rating (e.g., G, PG-13, R, etc.), the names of the producer, director, and actors, the duration of the program, the program type (e.g., situation comedy), and so on.

Note that, as used herein, "staging" involves the process of converting video streams to a digital (if not already in digital format), constant bit-rate (CBR), appropriate group-of-pictures (GOP) structure (15 or 30), Internet-protocol (IP) format (for multicasting through a network). Staging is applicable to a variety of scenarios, including Switched Digital Video (SDV), Digital/Analog Simulcast, NDVR/NPVR, video over IP/IPTV, and the like, and works in essentially the same fashion in all the exemplary cases.

In some instances, processor 109 may also create, in real time, trick files associated with the program, as part of the asset, which are used to perform trick mode functions (e.g., pausing, rewinding and fast-forwarding) on the program (processor 109 may form, e.g., a transport stream, including at least one trick mode video elementary stream). One such trick file in this instance is a "fast-forward" trick file which contains an array of identifiers of I-frames in the program stream (MPEG-2 encoded, in this particular example, as mentioned before) corresponding to the program in a forward direction. Another trick file is a "rewind" trick file which contains an array of identifiers of I-frames in the program stream corresponding to the program in the reverse direction. The I-frame identifiers in the trick files are used as indices or markers for rewinding and fast-forwarding of the program. It should be noted that not all of the I-frames associated with the program are selected for the trick files. Rather, the I-frames are selected periodically along the program stream. Thus, the shorter the period is, the closer the instants from which the program can be rewound, and to which the program can be fast-forwarded, thereby achieving finer adjustments.

It should be noted that where the program is not an initial broadcast program, which may also be pre-staged, the commercial segments may not contain the commercials originally provided by the program provider. Rather, the program may, in some instances, be repackaged with aftermarket commercials, which may be targeted to the user, and which may even be injected anywhere in the program with no regard for the original segments in terms of their timing, duration, or quantity. In the event that the program is pre-staged, the program content comes with the corresponding metadata file and trick files associated with the program. Further, in some instances, processor 109 stores the created or pre-staged asset including the metadata file and trick files associated with a program according to its program designation in asset storage (not explicitly called out), which may reside in library manager 113.

The transport streams generated by processor 109, which contain live TV programs in this instance, are fed to cache manager 111. The latter includes a cache memory (not explicitly called out), e.g., a disk cache, having a memory capacity on the order of terabytes. Manager 111 copies the transport streams onto the cache memory, and also forwards the same to library manager 113 for long-term storage. The latter includes library storage having a memory capacity on the order of hundreds of terabytes, much larger than that of the cache memory, such that the cache memory stores the last Y hours' worth of the TV programs while the library storage stores the last Z hours' worth of the TV program, where the value of Z is much greater than that of Y. It suffices to know for now that use of the cache memory, which affords faster access to its content than the library storage, facilitates a speedy retrieval of a requested program in the event of a "cache hit," i.e., the requested program being within the last Y hour broadcast. Conversely, a "cache miss" requires locating the requested program in the library storage, thereby incurring a delay in the retrieval of the program.

Cache manager 111 may be coupled, for example, to VOD server 105. Further details may be had in, for example, U.S. Pat. No. 7,941,823 of Charles Hasek, TRANSPORT STREAM ENCAPSULATED TRICK MODES, hereby expressly incorporated herein by reference in its entirety for all purposes.

One or more embodiments focus on acquisition processing and distribution of VOD assets. Currently, incoming content in a video content network is handled in a linear fashion. A piece of content is brought into the network and is always processed the same way by doing a series of things in a specific order. There may be a variety of intended end products, and it may not be apparent immediately what the end product is supposed to be—for example, the asset could be intended for an ABR (adaptive bit rate video playback) environment, a QAM (quadrature amplitude modulation) plant, and so on, but this will not be apparent until the work flow is ended. Furthermore, while some current processes are no longer FIFO (first in first out), there is still a challenge in that everything is linear and it is rare to see something prioritized within that linear flow. Resources get assigned at the time of acquisition and there is limited flexibility past that point.

One or more embodiments make the process more streamlined and/or more accurate, and/or provide better metrics and monitoring about the whole system. One or more embodiments permit nonlinear processing of incoming assets. In one or more embodiments, the first task applied to a piece of content upon intake is to ascertain what end result (goal) is desired. Once the goal has been ascertained, that goal is assigned to the media object or asset ("media object" and "asset" are used interchangeably herein) and then another system is provided, separate from the content management system, which runs what may be characterized as "little sets of operations." Non-limiting examples of such operations include file or archive management, normalization of metadata, file transfer, packaging, encoding, etc. Unlike the way in which the process is currently carried out, where everything is "strung together" at the beginning, in one or more embodiments, a process reviews all media objects or assets and determines if its operation is needed for the goal to be completed. For example, metadata management may be assigned to both adaptive bit rate (ABR) and quadrature amplitude modulation (QAM) goals. On the other hand, an encoding process might, for example, just be employed for ABR work. Each operation in essence looks at a particular media object or asset and asks, in effect "Are you something that I should be working on?" The operation addresses only the media objects or assets it should be looking at, and then asks, "Do you fulfill my prerequisites?" If yes, the operation (also referred to as module) takes the action that the operation/module has to do, and inside of the operation's/module's queue, prioritizes that action based on appropriate prioritization parameters. To re-state, if a module is picking up an asset to work on, when it sees an action that it has to undertake, it puts that action into a queue specific to that module, and prioritizes it based on prioritization parameters.

If prerequisites are not yet fulfilled (e.g., don't have source material for encoding because metadata 3.0 is being employed and a pull must be carried out before the contents come in), simply update the asset and its metadata to say, in effect, "I looked at it, but it is not ready for me yet." The preceding describes the working of one module; however, myriad (e.g., a hundred) different modules can all be working on the same media object or asset simultaneously and either acting on it or not based on those prerequisites. For example, metadata management, file distribution, and transcoding can all be handled at the same time instead of in a linear or sequential fashion. This advantageously allows for workflow optimization and streamlining. The data generated by these reviews may be collected and collated in to improved metrics and monitoring around the lifecycle of assets. It is possible to determine the number of assets being acted on for a specific piece of the process, and compare that data against the previous day's data. This affords a much deeper, more granular view, than has been possible using prior art techniques.

Furthermore, the system is no longer dependent on whatever happened beforehand, and the system can be prioritized at a granular level, making it such that C3 content, D4 content, and long tail content are prioritized in more granular ways than previously possible. The use of the granular data allows for an understanding of the actual time taken to complete the process as well as how specific systems or services affect time to completion. All of this data can be added into the prioritization of an asset within the specific process. Note that "C3" refers to assets within the first 72 hours after broadcast—they must contain and play back the ads broadcast, which allows for inclusion within the ratings for the program. As far as D4 assets ("day four"), these do not count to the initial broadcast and "costs for eyeballs." They can therefore have new ads inserted and have a much longer availability window. "Long tail" colloquially refers to content that makes the library "look great" but does not get massive consumption, from the diminishing portion of a Gaussian error curve ("long tail").

The aforementioned data addition permits more efficient and controllable resource management as compared to prior art techniques. The additional degree of information and control allows for a more elastic, cloud-based encoding where the cloud can be enlarged, for example, if it is known that capacity is currently at the 80th percentile of the number of encoding processes permitted. Conversely, if the number of processes drops back to the $60^{th}$ percentile, the cloud size can be reduced. This can be done on a very finite control level. In contrast, heretofore, a human agent has been required in content operations, or a very complex algorithm, which watches the entire farm to know when to grow and shrink the cloud, has been employed.

While one or more embodiments are directed to the intake of VOD assets from the content provider, this is not a limitation, and at least some aspects of the invention can apply to distribution as well (indeed, any action that can be taken on a piece of file-based content can be done in accordance with aspects of the invention rather than in a linear fashion). In one or more embodiments, the operations or modules are designed around the prerequisites to ensure that certain things do not happen at the same time. Modern-day databases and systems permit multiple actions on metadata at the same time. However, prerequisites are introduced to prevent conflict. For example, it may be appropriate if the operation or module that performs the assignment of categories waits until all the other normalization happens, because new keywords are generated in the normalization process and they directly impact the assignment of categories. Advantageously, in one or more embodiments, the asymmetric workflow permits parallelization, with control at an operator level in a fully-automated model.

The skilled artisan will appreciate that it is known in the world of software to carry out multiple operations at the same time and to have small modules all acting on things at the same time. One or more embodiments apply such techniques in a new way to a new problem; namely, how to deal with the workflow for, e.g., an incoming media object or asset. Furthermore, one or more embodiments bring what was previously done at a code level or micro level (little pieces of code that are acting into a piece of software) up to actual operations and workflow actions (macro level).

One or more embodiments thus provide a content management or workflow management system undertaking finite operations in a modular model.

As noted above, components carrying out media object or asset intake may reside, for example, in a head end, regional data center, or national data center. In at least some embodiments, techniques described herein are implemented at the data center level, but this is not intended to be limiting unless set forth in a particular claim.

Figure 8:
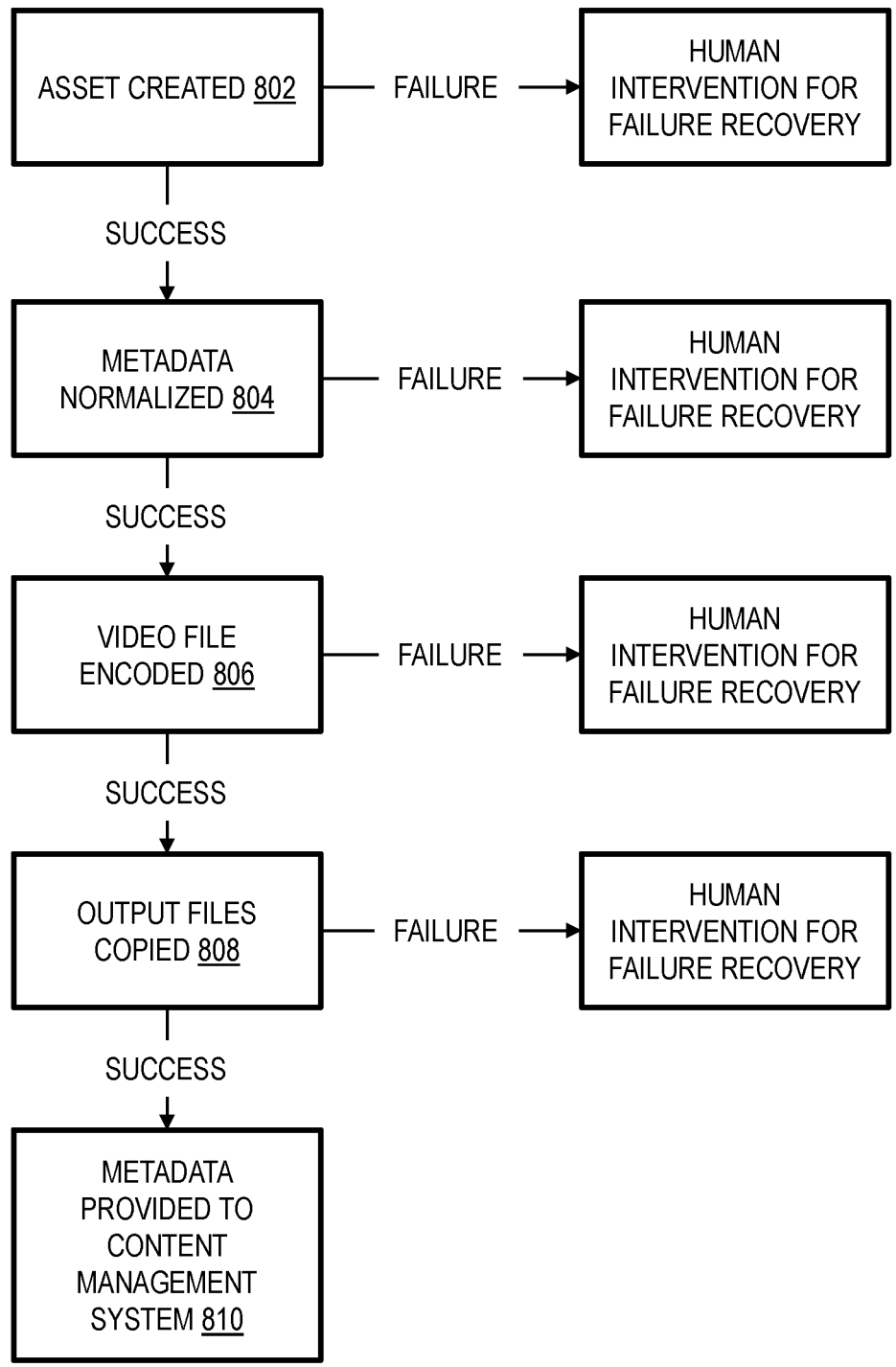
FIG. 8 shows intake of a video asset in accordance with a prior art technique.
Figure 9:
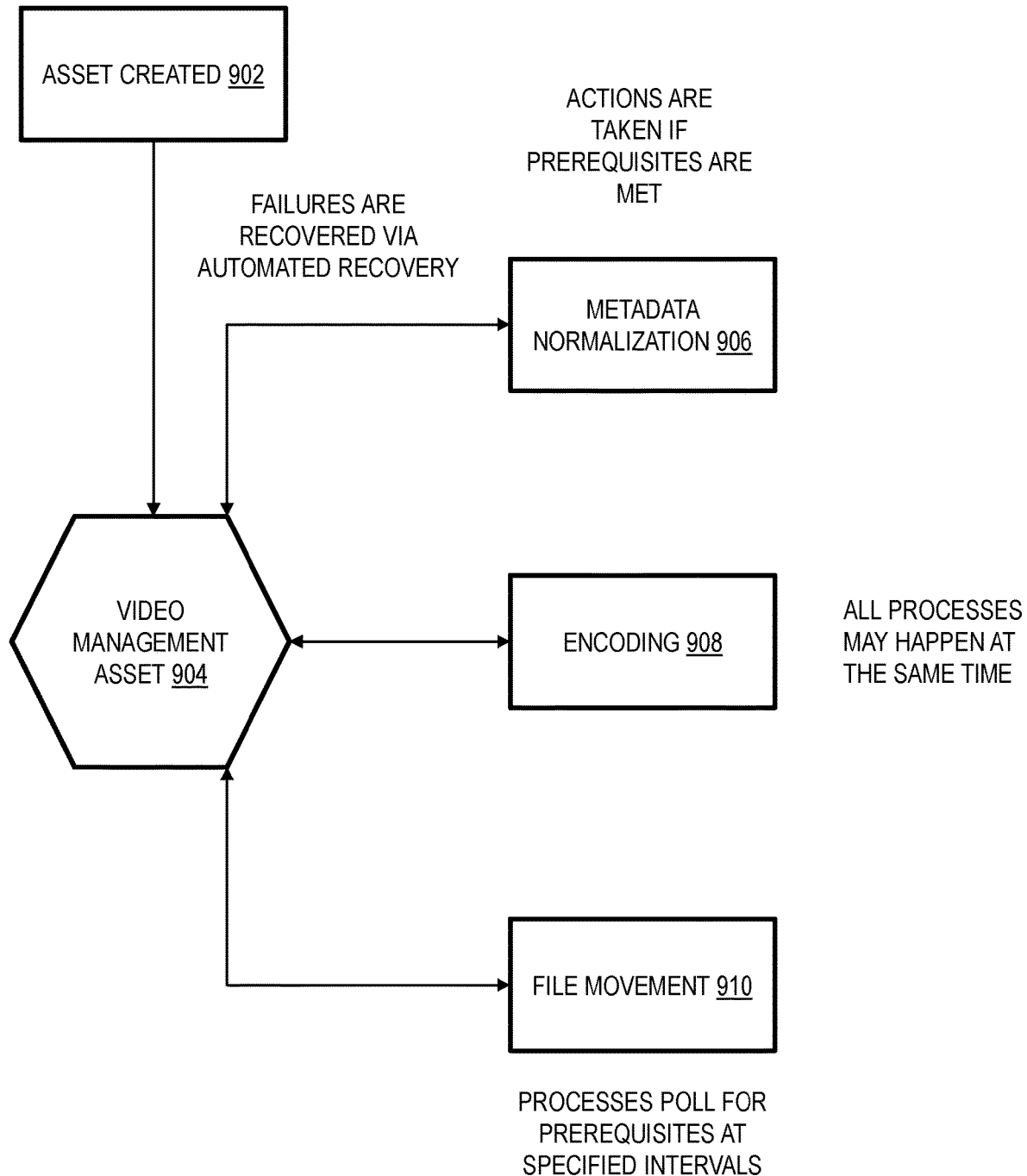
FIG. 9 shows intake of a video asset in accordance with an aspect of the invention.

Refer to FIG. 8 which depicts asset intake in accordance with the prior art. In essence, processing occurs in a linear chain, and failure requires human intervention. On the other hand, FIG. 9 shows processing in accordance with an embodiment of the invention. An asset is created at 902 and is processed into a video management asset 904 using a number of actions which are taken in parallel, assuming that various prerequisites are met. Actions include metadata normalization 906; encoding 908; and file movement 910.

Now considering FIG. 8 in greater detail, in step 802, an asset is brought into the system. In case of any failure, the process is stopped, and human intervention is needed for failure recovery. If step 802 is successful, move forward to deal with metadata normalization in step 804. The metadata normalization may be a manual process and the failure may be human error; however, most current approaches employ some form of code to undertake the baseline metadata normalization. Again, in case of any failure, the process is stopped, and human intervention is needed for failure recovery (failure recovery could be automated in a limited way in some instances). In some cases, metadata normalization is normally automated but could be manual, while recovery from failure of metadata normalization can usually be manual but could be automated in a limited way in some cases. More generally, in one or more instances, everything can be automated or manual in nature. In some approaches, automated failure recovery merely involves repeatedly trying the same thing hoping for a successful result. Human intervention often finds the specific error because humans have fuzzy logic where computers do not.

If step 804 is successful, move forward to video file encoding in step 806. Again, if step 806 fails, human intervention is required for failure recovery while if step 806 is successful, move forward to output file copying in step 808. If step 808 is successful, provide the metadata to the content management system in step 810; while if step 808 fails, human intervention is required for failure recovery.

In the prior art process of FIG. 8, whether dealing with encoders, file movement, metadata processing, or even a human editing process, in each case, it is necessary that everything prior has been completed, and that the individual step in question has succeeded, in order to move forward. Otherwise, the operation is not carried out. For example, in the case of video encoding, there is a metadata field of "can be encoded." Some providers provide assets with metadata that forbids any change, including encoding. Suppose this is erroneously applied in some case: the entire process will stall, and flow will never move beyond the stalled encoding step 806. Thus, in the prior art approach of FIG. 8, a failure stops the entire line, because the process is a linear progression.

In the exemplary embodiment of FIG. 9, a failure at asset creation step 902 could stop the entire line; however, once the asset is created, all the processes (e.g., metadata normalization 906, encoding 908, file movement 910, publishing (not shown), and whatever else is required) can act at the same time. Each action can proceed once its own prerequisites are met; each action does not need to wait for every other action to have the other actions' prerequisites fulfilled. In the approach of FIG. 9, the failure states act back on the asset to allow things to happen. For example, for a process that creates MPEG-2 packages for the QAM VOD environment to play out, one prerequisite might be the requirement to have an encoded MPEG-2 file that fits the QAM requirements. The video asset can be updated to indicate that without such a file, the process cannot move forward. The next time the encoding process engages the video asset, the process in effect "says" "Oh, I have to encode this." Metadata manipulation as well as variables like asset delivery type, directory location on storage, video file media information, and the like can be utilized to generate the data needed to determine if a process should be executed. Any piece of metadata can fulfill the requirement of "I need to encode an MPEG-2 file." As soon as the encoding process 908 sees that metadata, the encoding process 908 can act on the asset.

In one or more embodiments, the encoding module 908 is not quite stand-alone per se, because it is desirable to have all the components of the system be able to communicate with one another; however, the encoding module 908 is a "node unto itself" in the sense that it is an entity within the environment which determines whether it can act on an asset and if so, proceeds to do so; and if not, takes the next appropriate action (in a non-limiting example, flagging for human intervention). In one or more embodiments, all of the various processes required for workflow management can happen at the same time, as long as the prerequisites are fulfilled (but do not necessarily always happen at the same time).

In one or more embodiments, at a minimum, an asset includes metadata, and files that can be utilized for whatever the desired experience is (e.g., for a web site, images; for a cable plant, video files). In the typical case of a cable plant, the assets therefore include metadata and video files (optionally with still files such as box art or the like). Metadata includes two types of descriptors: a descriptor that talks about the content as a whole (e.g., title of movie, actors in the movie, operational IDs such as a package ID (see, e.g., Cable Television Laboratories, Inc., Metadata Specifications, CableLabs Asset Distribution Interface Specification Version 1.1, MD-SP-ADI1.1-C01-120803, Aug. 3, 2012, expressly incorporated herein by reference in its entirety for all purposes—"ADI")) as well as metadata that is specific to the files contained in the asset (e.g., file name and location). Consider metadata normalization for a basic package. Incoming content includes metadata and a video file. The metadata normalization module 906 sees that the object has metadata, reads the metadata, and determines that some information is missing. The metadata normalization module 906 determines what to do about the missing information. In some instances, the entire package is failed. In other instances, move forward and apply a default to the missing information. For example, suppose the content provider fails to provide a metadata field with the price for the asset. A rule can be provided such that if no price field is provided, the price field is updated to a value of $4.99 (or other appropriate price value, or a value of zero, and so on). The chosen default value may itself depend on other information. In the prior art approach, the entire process would hang up without the price.

Similarly, with regard to the encoding block 908, the module 908 examines the metadata of a video file to determine what to do with the video file. Options could be, for example:

ignore it (say an MPEG-2 file known from the metadata to be destined for the QAM plant which is already encoded to match the MSO's specification);

create an MPEG-4 asset from an MPEG-2 file, by encoding based on relevant parameters.

In one or more embodiments, modules 906, 908, and 910 act on asset 904 every predetermined period of time, at the same time (e.g., every 5 minutes or whatever other appropriate time period the system is configured for). Encoding module 908 "says" "I see a video file; look through the metadata and see if I can encode it." In some instances, the module 908 ignores the file on this pass (t=0), but not forever; i.e., it checks again after 5 minutes (t=5) (or whatever other time period is being used) (this is not a failure). Thus, how often asset 904 is looked at by the process is configurable. It may be viewed every pass, every other pass, every third pass, checked every minute, wait 5 minutes, wait 1 hour, or the like. The file movement module 910 might also "say" "I see a video file, but there is no information about where to move it, so I will ignore it for this pass." In this first pass (t=0), metadata normalization block 906 is acting, but encoding block 908 and file movement block 910 take no action (but will check again after 5 minutes (t=5) or other predetermined amount of elapsed time).

Then, when the metadata update (by module 906) finishes, it may have been determined, e.g., that the asset is from content provider X and therefore destined for both a QAM plant and an ABR (adaptive bit rate) Internet Protocol (IP) plant. The asset therefore needs to be encoded in several different ways (numerous different video files are required as prerequisites to permit the desired types of playback). Suppose this requires one minute of work. Then, four minutes later (total of five minutes from last attempt, t=5), the modules 906, 908, and 910 "fire off" again. Metadata normalization module 906 determines that it has completed its work for the time being, and takes no action at this time (t=5), checking again in five minutes (t=10). On the other hand, encoding module 908 now (at t=5) sees the required destinations and proceeds to encode for the required outputs. If it fails, failure could trigger appropriate actions, including pinging a human operator in the NOC (Network Operations Center), COSC (Content Operations Support Center), BOC (Broadcast Operations Center), or the like (generally, 24 hour a day seven day a week team of tier 1 support for the systems and services) to determine the problem; undertaking a deep scan for quality assurance on the file; or the like. On the other hand, success results in the required aforementioned numerous different video files.

Meanwhile, file movement module 910 now (at t=5) knows the required locations, but since encoding module 908 has just started encoding, the files that need to be moved have not yet been created. Accordingly, file movement module 910 again takes no action (but will check again after 5 minutes (t=10) or other predetermined amount of elapsed time). At t=10, metadata normalization module 906 checks but takes no action; encoding module 908 has completed the encoding of some but not all files; and file movement module 910 commences moving only those files that have been encoded. File movement module 910 continues to check for completion of encoding of additional files, every 5 minutes, or other predetermined time. In some embodiments, the time which file movement module 910 waits before checking again may be different than the other time periods (e.g., once it knows the encoder is encoding, it checks every 1 minute instead of every 5 minutes for completion of encoding of particular files).

It will thus be appreciated that, in the exemplary embodiment of FIG. 9, even though a linear progression of steps was in one sense required (e.g., it was necessary to normalize the metadata, then encode, and then move), all modules tried to act at the same time, and could have acted at the same time. For example, metadata normalization and transcoding can be carried out in parallel in one or more embodiments. Encoding refers to taking a raw, pure, source material and creating an output. Transcoding refers to taking compressed content and converting it to a different type of compression. An encoding farm is typically used to carry out transcoding. The skilled artisan will appreciate that encoding block 908 generally represents both encoding and transcoding. One or more embodiments can also, for example, transcode for an IP plant while distributing to the QAM plant in parallel. One or more embodiments permit parallelization not only of "macro" aspects such as transcoding, distribution, and metadata normalization, but also permit performing smaller components of these "macro" aspects in parallel. Thus, workflows contain actions, which heretofore have been carried out in a linear fashion but can now be carried out in parallel. For example, in some prior art techniques, a workflow engine attempts to kick off a number of parallel transcoding processes at the same time, whereas in one or more embodiments, the transcoding processes all look at an asset to see if they can execute at the same time. Stated somewhat colloquially in another way, instead of actions kicking off other actions, as in the prior art, in one or more embodiments, actions try to find something to do.

In one or more embodiments, modules such as 906, 908, and 910 are autonomous or semi-autonomous, such that each pings the asset 904 periodically to see if it is ready for them to operate on. The modules may, however, share code; may share GEMS if implemented in RUBY (GEMS and RUBY are a non-limiting example); and at least some of their components may be the same. For example, the process used to pull the metadata out of the video management asset 904 may be the same across all four modules. However, the modules act in their own standalone manner even though they share resources, and thus may be viewed as at least semi-autonomous.

Note that in some instances, the time period for pinging may also be lengthened from 5 minutes; for example, when a module has already acted on an asset, the time might be gradually increased from every 5 minutes to once a day. These values can be configurable. On the other hand, in at least some instances, modules or subroutines 906, 908, 910 all "fire off" at the same time.

Consider a case where an asset is ready to be sent out on a QAM plant, but not an ABR IP plant. It is possible that the MSO may work with the provider to have a significant amount of metadata put into the asset ahead of time, to use as flags (e.g., when the asset is pitched to the MSO from the provider, it already has a metadata flag set indicating that it is permissible to stream this asset on the ABR IP plant). All three modules 906, 908, 910 may then act on this asset at the same time. Metadata normalization module 906 starts changing certain aspects of the metadata, or at least verifying that the metadata is not improper or corrupted. For example, some deployed STBs 106 will crash and re-boot if they see specific special characters. Metadata normalization rules change them to plain text (example: "umlaut" to - - u - -) to avoid this, for example. At the same time, the encoder 908 notes that the metadata is flagged indicating that ABR encoding is required, and that there is no ABR output in the package that arrived. The encoding process therefore kicks off that work. File movement module 910 notes that video files needed for ABR are not present yet; however, those needed for QAM are present. It therefore begins copying over the files needed for QAM. Thus, in some instances, all three processes act simultaneously, with other subroutines waiting to act once they complete their work (via polling). One or more embodiments are thus "as parallel as the asset(s) 904 permit(s) and as linear as the asset(s) 904 require(s)," advantageously enhancing system scalability.

In a non-limiting exemplary embodiment, modules 906, 908, and 910 all reside within an NDC 1098; however, in other embodiments, the processing can be distributed in RDCs 1048, head ends 150, off site at locations of third party providers, and/or other appropriate locations. Furthermore, all three components can be collocated, or they can be located in two or more different places. Some embodiments provide geo-redundancy between two NDCs 1098. For example, when the encoding plant notes that it needs to encode ABR, it checks whether the file is residing in a first NDC, a second NDC, or both NDCs. The encoding plant decides which file to operate on, if available in both places, based on factors such as available hardware, file type, and the like.

The skilled artisan will thus appreciate that ABR is part of the HTTP Live Streaming (also known as HLS) specification (an HTTP-based media streaming communications protocol implemented by Apple Inc. as part of its QuickTime, Safari, OS X, and iOS software) and Smooth Streaming from Microsoft. Refer to R. Pantos, Ed. and W. May, Apple Inc., Internet Engineering Task Force (IETF), Nov. 19, 2015, HTTP Live Streaming draft-pantos-http-live-streaming-18, hereby expressly incorporated herein by reference in its entirety for all purposes. HTTP adaptive bit rate is currently being used with YouTube, TWC TV, Netflix, Amazon Prime, and other internet-based video providers, who, in general, are shifting to the ABR model. Pertinent specifications include the MPEG dash specification. Dynamic Adaptive Streaming over HTTP (DASH), also known as MPEG-DASH, is an adaptive bitrate streaming technique that enables high quality streaming of media content over the Internet delivered from conventional HTTP web servers. ABR requires different file formats than traditional QAM. Reference is made to Iraj Sodagar, INTERNATIONAL ORGANISATION FOR STANDARDISATION, ISO/IEC JTC1/SC29/WG11, CODING OF MOVING PICTURES AND AUDIO, ISO/IEC JTC1/SC29/WG11 W13533, April 2012, Incheon, KR, Communication Group, White paper on MPEG-DASH Standard, MPEG-DASH: The Standard for Multimedia Streaming Over Internet, hereby expressly incorporated herein by reference in its entirety for all purposes.

In some instances, very high quality source material is obtained from the content provider (a so-called "mezzanine file"). The mezzanine file is then encoded in MPEG-4 for all the different bit rates that it is planned to use, as well as what is needed for QAM. ATSC C2 provides an IP streaming protocol that allows playback to the QAM plant.

A variety of delivery mechanisms can be employed in connection with one or more embodiments. In a non-limiting example, the mechanisms include one, some or all of the following: QAM playback, IP streaming playback, IP downloads, and QAM downloads.

By way of further review, in current workflows, an asset is added to the content management/workflow management system, and a workflow or multiple workflows are kicked off. In the prior art example that follows, a single workflow will be discussed but one or more additional workflows could be running in parallel with the first workflow. In the exemplary prior art workflow for a VOD asset, files are moved to locations needed to perform the following steps. The asset is checked to make sure it meets source requirements (this may include metadata checks and/or video source and/or quality checks). Encoding of video source files to one or many outputs is performed. Files are moved to destination locations. Metadata is updated, and downstream systems are informed that an asset is available. This exemplary prior art workflow is very linear in nature, as each step and/or process must be performed in whatever order is specified by the workflow management system. If something fails, the workflow stops and the asset is put into a "failure state." Also, humans typically have to interact with these steps as part of quality assurance (QA) checks etc.

In contrast, in one or more embodiments, an asset is created, as at 902, and goals, outputs, and/or end-products are assigned. These are the expected final products for this asset. In a non-limiting example, this would be QAM content that is hosted in a market center or national center;

alternately or in addition it could include ABR and/or other outputs. All processes know the end-products they are associated with, so they scan for any assets that fall within their ambit. If the end-product matches, then the asset is checked for the given process's pre-requisites. If these are met, then the process will start. Examples include QA testing for source files, encoding, metadata normalization, and/or distribution.

One significant aspect of one or more embodiments is that as many processes (e.g., 906, 908, and 910) can work against a given asset 904 as have pre-requisites met at the same time. This means that metadata normalization 906 and distribution could happen at the same time as encoding 908 is being done. This allows for a larger number of processes to be run and completed in the same amount of time without having to have processes sitting around and waiting for an unrelated step to be completed before the next can be done. Furthermore, metrics and monitoring no longer need to look for a full workflow to be completed; they now merely look to see whether the asset completed what is needed to create the expected end-products.

One or more embodiments thus provide asynchronous workflows, which address the fact that current workflows are linear in nature (and therefore, the speed at which content is provided can be limited). One or more embodiments adapt the computing model of asynchronous calculations or actions into the content workflow space. One or more instances allows for multiple actions to happen on a single asset at the same time. One or more embodiments also create real time metrics and monitoring with a much higher degree of accuracy. Furthermore, the use of historical logging of lookups and actions against an asset allows for alerting and reporting on the success and failure of assets in ways that are currently not available in the existing linear workflows.

One or more embodiments provide a next generation workflow by creating an asynchronous workflow. This in turn is defined by the fact that, in one or more embodiments, all assets may be polled for any and all operations that can be taken against them. If the asset has the correct components or metadata for the operation it will be executed against. An asset may have one or many processes running against it at any given time. In one or more embodiments, at all times, the operations will add time-stamped information on the actions taken against an asset to allow for metrics and monitoring to be more effective.

Figure 10:
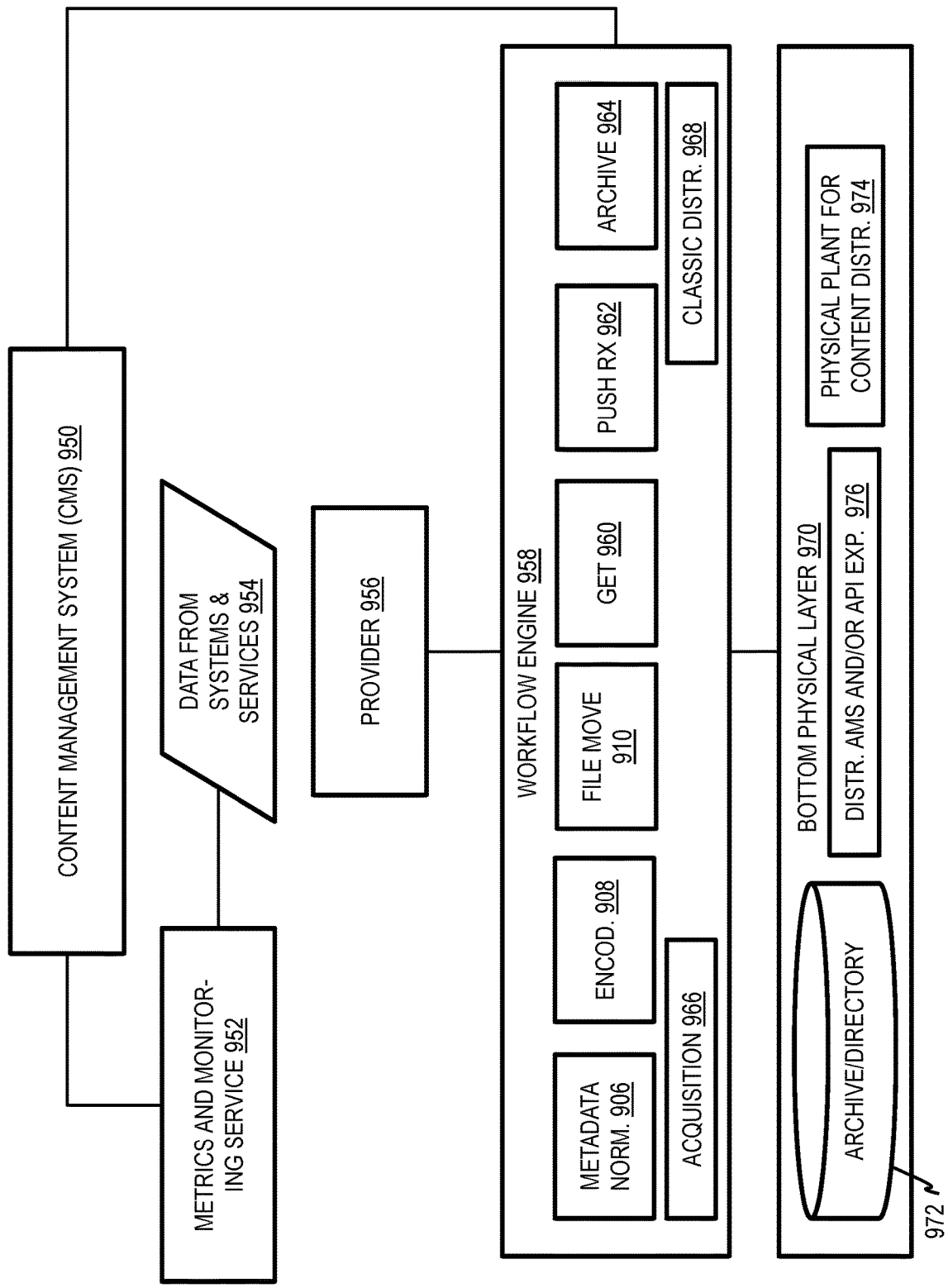
FIG. 10 shows a block diagram of a system in accordance with an aspect of the invention.

Referring now also to FIG. 10, the basics of the workflow are as follows. A content management system (CMS) 950 holds all of the data about assets, the lifecycle of the asset, and the components of the asset. A metrics and monitoring service 952 combines the data within the CMS with data 954 from the various systems and services to give data on overall health of content and the system. One or more embodiments include three layers. A top layer 956 includes the provider (entity that is providing the content). A bottom physical layer 970 includes one or more of storage 972 and hardware systems, encoder (see discussion below regarding components that can be implemented in hardware and software), and physical plant for content distribution 974 (e.g., QAM streamer, CDN, and the like). In a middle layer including workflow engine 958 reside all the modules that take things from point A to point B. The GET module 960 is doing pulls from the provider 956. A different module 962 is receiving pushes from the provider. There are modules dealing with content normalization (e.g., taking rules and applying the rules to the assets such as metadata normalization module 906). There are modules that handle transcoding, as at 908, and file movement, as at 910. In one or more embodiments, the top layer and the bottom layer are part of the physical layer. The provider provides, by way of example and not limitation, IP digital media. The CDN, the storage, the QAM playback services, the ABR playback services, and the like are all physical things that are used to store the asset, to watch the asset, to somehow affect a change on the asset such as a transcode (see discussion below regarding components that can be implemented in hardware and software). The middle layer includes software in one or more embodiments; i.e., the modules that are taking different sets of actions. These things are all looking to carry out tasks, in parallel, against the provider and/or to the outbound location (e.g., CDN). The software modules in the middle layer are looking at the physical layers, e.g., provider 956 or CDN or other physical piece in 970. In one or more embodiments, all are looking at the same time to see if they can act. Anywhere from one to an infinite number of the software pieces in the middle layer can act at the same time on a given asset, based on where it is and what is going on. In a non-limiting example, components are in one or more NDCs 1098 to allow for redundancy. A workflow engine 958 polls the CMS 950 to determine a list of assets that need to be acted upon for a discreet step and/or operation in the workflow. This list of assets is prioritized based on generic and specific configurations. The workflow engine has a series of modules that perform a specific step and/or operation (e.g., encoding).

As alluded to parenthetically above, in some instances, at least a portion of some of the modules or processes can be implemented at least partially in hardware. For example, an encoding or transcoding module can be implemented entirely in software running on a general purpose machine, or can be implemented at least partially in hardware within the physical layer, as will be appreciated by the skilled artisan.

In an exemplary embodiment, module 966 "Acquisition" runs. This module looks for new extensible markup language (XML) files within specified storage locations. If an XML file is found, it is checked to see if it conforms to an accepted rules set. If it fails, an alert is generated in metrics and monitoring. If it passes, the XML is used to generate an Asset within the CMS, as depicted at 902. In the exemplary embodiment, a File "GET" module 960 (which may or may not be built into the Acquisition module) is provided. The XML has references to the files that came with the package. The goal of this module is to collect all the files needed and copy them to the archive 972. This includes the source XML file. The archived files are placed in a directory in 972 following the aforementioned CableLabs Asset Distribution Interface (ADI) Specification Version 1.1 model. Regarding the concepts of archive and directory, in one or more embodiments, in the bottom layer, there will be processed files that modules of the middle layer have acted upon. "Archive" refers to both the module 964 that does the archiving (action), which moves files into longer term storage. There is also the archive 972 as a physical object, i.e., the storage that the files have been placed on. The skilled artisan will appreciate from the context whether "archive" refers to the process/module and/or the physical storage location.

A module for Classic distribution 968 runs against the asset (it may have run against the asset before, but the asset did not pass the requirements as it did not have the needed files on archive or elsewhere—if this has happened there is a timestamp that was added to the asset to state it was passed over and when). Thus, the module for classic distribution may have tried to run against the asset previously but the asset may not have met the requirements for classic distribution at that time. In such a case, place a time stamp on the asset to explain when it occurred. There has been some elapsed period of time and now try again to see of it is eligible for classic distribution. If the asset was pitched with the MPEG2 file needed for classic distribution (i.e., traditional QAM—may require a Media Info to know if it is, discussed below), a proper ADI 1.1 package is generated using the metadata from the CMS combined with the files that are part of a classic package. This is handed to the Distribution AMS (asset management system) 976 and/or posted via application programming interfaces (APIs) if the AMS allows.

MediaInfo is a free and open-source program that displays technical information about media files, as well as tag information for many audio and video files. MediaInfo extracts information (parameters of the video file's construction—"height," "width," structure of packets (GOP or group of packets structure), what channel is English audio, what channel is Spanish audio, what the closed captioning information is, and the like). Information of this nature is contained within a MediaInfo query. MediaInfo is but one non-limiting example of techniques to know the parameters of the video file. The skilled artisan is familiar with the MediaInfo app, and given the teachings herein, will be able to use the MediaInfo app or an alternative technique to implement one or more embodiments. A cable multi services operator (MSO) or similar entity will have suitable specifications (e.g., developed in-house or in concert with an entity such as Cable Television Laboratories, Inc. (CableLabs®)). These will specify what is an acceptable video file for playing back on the QAM plant, in high definition (HD) and standard definition (SD); what is acceptable for playing back on the ABR plant, and so on. A comparison can be made between the information obtained from the MediaInfo query or similar query, and the appropriate specification, to determine if the required prerequisites are met. In a non-limiting example, suppose a video file comes into the system in a high quality format—the file will not meet the specifications for QAM playback because it is too large. The file is transcoded to create an output appropriate for QAM playback. The transcoded file will meet the prerequisites because now, the information obtained from the MediaInfo query or similar query will meet the known requirements.

In one or more embodiments, Metrics and Monitoring systems 952 collect the data related to arrival of an asset, and registration of same, at a national distribution CMS as well as each market center edge (a non-limiting example is the Time Warner Cable MBO (Mystro Back Office) QAM system edge service). This data is added to the CMS.

If the asset has a metadata update (MDU—defined in the aforementioned CableLabs® Asset Distribution Interface Specification, Version 1.1, MD-SP-ADI1.1-C01-120803, format of data, section 5.1), the update is added to the Asset through the Acquisition module 966 and flagged as an MDU. The Classic Pitch Module 968 (process that sends the content out for "classic" distribution—can be replaced by physical layer of CMS or distribution AMS or a piece of software that moves files to the distribution AMS) will push the update to the distribution system via APIs that will force the MDU out to all the market centers.

In one or more embodiments, if an emergency takedown is needed, a COSC (content operation support center) operator will go to the CMS and flag the asset for take-down, and a "content clean up" module will perform a take-down of the asset from the AMS and will use APIs to force the deletion of the asset from all market centers (regional data centers).

In one or more embodiments, the same processes will be available for re-pitches or changes that are market center specific, driven by metadata within the asset on the CMS. As used herein, a "re-pitch" refers to a case where an asset has already been "pitched" form a content provider to a network operator and that process is now being repeated a second or subsequent time.

Given the discussion thus far, it will be appreciated that, in general terms, an exemplary method, according to an aspect of the invention, includes the step of assigning at least a first goal to a media asset 904. The media asset includes content and metadata. This step can be carried out, for example, with a suitable content management system. A further step includes, for at least two of a plurality of processes (e.g., 906, 908, 910) of a workflow engine relevant to the at least first goal, simultaneously polling the media asset from time-to-time to determine whether prerequisites of each of the plurality of processes have been met. This step can be carried out, for example, by executing the appropriate processes (modules) of the workflow engine. An even further step includes, for at least one of the plurality of processes (modules) of the workflow engine for which the prerequisites have been met, acting on the media asset to achieve at least a portion of the at least first goal. This step can be carried out, for example, by executing the corresponding at least one process of the workflow engine.

Thus, in one or more embodiments, steps are carried out by the workflow engine and/or the modules. Each module can act independently based on communication with the workflow engine.

In one or more embodiments, in the acting step, all of the plurality of processes of said workflow engine for which said prerequisites have been met, simultaneously act on said media asset to achieve at least a portion of said at least first goal.

In some cases, in the assigning step, the at least first goal includes rendering the media asset ready for at least one of quadrature amplitude modulation playback, internet protocol streaming playback, internet protocol download, and quadrature amplitude modulation download.

In some embodiments, in the polling step, the plurality of the processes for the workflow engine include a metadata normalization process 906, an encoding process 908, and a file movement process 910. As noted above, the encoding process is an example of a process or module that can be implemented entirely in software running on a general purpose machine, or can be implemented at least partially in hardware within the physical layer.

In some instances, further steps include determining a fraction of capacity at which the encoding process 908 is currently operating; and carrying out at least one of:

allocating additional hardware resources to the encoding process if the fraction of capacity at which the encoding process is currently operating exceeds a first threshold value; and de-allocating hardware resources from the encoding process if the fraction of capacity at which the encoding process is currently operating is less than a second threshold value.

In one or more embodiments, the thresholds are a configuration item based on operator-generated rules. The operators of the system make a determination of appropriate threshold values based on pertinent factors. For example, it may be desired to always have ten encoders available at any given moment; or for the system to always have 80% capacity based on the queue; or to set up another encoder whenever five or more encode jobs are in the queue; or to spin down one encoder whenever the size of the encode queue has dropped by a multiple of five. One or more embodiments employ a cloud-based service where instructions are provided to a cloud controller console or the like to spin up a piece of hardware with a desired image on it, the image being an encoder. The appropriate parameters needed to spin up the encoder are provided; e.g., its new IP address. Thus, in one or more embodiments, there is a golden master of an encoder and one or more additional instances of same are instantiated because more encoding capability is needed (or that instance is destroyed because the capacity is no longer needed).

In some cases, further steps include assigning at least a second goal to the media asset (e.g., first goal is prepare for QAM, second goal is prepare for ABR IP); and assigning a first subset of the plurality of processes of the workflow engine to the first goal. The first subset of the plurality of processes include the above-mentioned plurality of processes of the workflow engine relevant to the at least first goal. Still further steps include assigning a second subset of the plurality of processes of the workflow engine to the second goal; and, for each of the second subset of the plurality of processes of the workflow engine, polling the media asset from time-to-time to determine whether prerequisites of each of the second subset of the plurality of processes have been met. An even further step includes, for at least two of the second subset of the plurality of processes of the workflow engine for which the prerequisites have been met, simultaneously acting on the media asset to achieve at least a portion of the second goal.

In one or more embodiments, processes are assigned to goals using the workflow engine and content management service to carry out configuration mapping, wherein it is specified that a certain goal needs certain prerequisites.

Where there are multiple goals, at least one of the plurality of processes of the workflow engine can be assigned to both the first subset of the plurality of processes of the workflow engine (relevant to first goal) and the second subset of the plurality of processes of the workflow engine (relevant to second goal).

In some cases, a further step includes, for at least one of the plurality of processes of the workflow engine for which the prerequisites have not been met, flagging the media asset to indicate to another one of the plurality of processes of the workflow engine that it should act on the media asset to fulfill at least one of the prerequisites which has not been met. For example, a package creation module might need an MPEG 2 file as a prerequisite but might note that the asset does not have such a file, and might flag the asset such that the encoding module 908 acts on the asset to prepare an MPEG 2 file. In one or more embodiments, this is done by the process that noted its prerequisite was not met; for example, the process sets a flag in the metadata. More generally, in one aspect, at the beginning of the process, when assigning a goal, a series of flags of things that need to be done can also be assigned. Alternatively, a module applies flags when it notes that its prerequisites were not met. Flags can be set, e.g., in the metadata or elsewhere in the workflow engine or CMS.

As noted, in some instances, polling of the media asset from time-to-time includes periodic polling at a fixed time interval for each of the plurality of processes of the workflow engine relevant to the at least first goal. For example, use can be made of a common clock signal accessible to all processes. Some embodiments employ the software utility Cron, which is a time-based job scheduler in Unix-like computer operating systems.

On the other hand, in some cases, one or more of the processes might be polled more frequently than one or more other ones of the processes. For example, one (or more) processes could be polled more frequently based on detecting that another one of the processes is actively fulfilling one or more prerequisites the process which is polled more frequently. Conversely, one (or more) processes could be polled less frequently based on detecting that the process which is polled less frequently has already acted on the media asset. Regarding detecting and/or determining these conditions and effectuating polling at different intervals, in one or more embodiments, these aspects are configurable. It can be specified, via configuration, to carry out polling only at a certain time stamp, or only at a certain offset from a certain timestamp, or at a certain offset from the last time action was taken, or the like.

One or more embodiments can be used for asset intake and/or asset distribution. The skilled artisan will be able to implement asset intake and/or asset distribution based on the disclosure herein. In a non-limiting example, intake is carried out with the GET module. For example, in some cases, a receiver module is provided (e.g., an FTP (file transfer protocol), SFTP (secure file transfer protocol), or other data transfer protocol location that is being monitored for new content). It receives a piece of XML code that falls under an appropriate specification. The receiver module informs the GET module that there are files at location "XYZ." Then, the GET module picks up that information and carries out a GET against a server that is owned by the provider, to pull down the files that are needed for all the other processing. In another aspect, a "pure" GET module is employed, wherein the provider indicates a predetermined location where the provider locates XML, and the "pure" GET module polls that location on a regular basis for new files and pulls those files down. These are non-limiting examples of intake. As for distribution, non-limiting examples include a "classic" (QAM) distribution module, CMS, or the like.

It is worth noting that, in one or more embodiments, metadata normalization and transcoding can be carried out in parallel. Encoding refers to taking a raw, pure, source material and creating an output. Transcoding refers to taking compressed content and converting it to a different type of compression. An encoding farm is typically used to carry out transcoding. The skilled artisan will appreciate that encoding block 908 generally represents both encoding and transcoding. One or more embodiments can also, for example, transcode for an IP plant while distributing to the QAM plant in parallel.

Furthermore, given the discussion thus far, it will be appreciated that, in general terms, another exemplary method, according to another aspect of the invention, includes the step of assigning at least a first goal to a media asset 904. The media asset includes content and metadata. This step can be carried out, for example, with a suitable content management system. A further step includes, for each of a plurality of processes (e.g., 906, 908, 910) of a workflow engine relevant to the at least first goal, polling (optionally simultaneously) the media asset from time-to-time to determine whether prerequisites of each of the plurality of processes have been met. This step can be carried out, for example, by executing the appropriate processes (modules) of the workflow engine. An even further step includes, for at least two of the plurality of processes (modules) of the workflow engine for which the prerequisites have been met, simultaneously acting on the media asset to achieve at least a portion of the at least first goal. This step can be carried out, for example, by executing the corresponding at least two processes of the workflow engine.

In another aspect, an exemplary apparatus includes a memory (e.g., a volatile portion of memory 730 discussed below), at least one processor coupled to said memory (e.g., processor 720 discussed below); and a non-transitory persistent storage medium (e.g. hard disk portion of memory 730 discussed below) which contains instructions which, when loaded into said memory, configure said at least one processor to be operative to carry out any one, some or all of the method steps of the method disclosed herein.

System and Article of Manufacture Details

The invention can employ, for example, a combination of hardware and software aspects. Software includes but is not limited to firmware, resident software, microcode, etc. At least a portion of one or more embodiments of the invention or elements thereof can be implemented in the form of an article of manufacture including a machine readable medium that contains one or more programs which when executed implement such step(s); that is to say, a computer program product including a tangible computer readable recordable storage medium (or multiple such media) with computer usable program code configured to implement the method steps indicated, when run on one or more processors. Furthermore, at least a portion of one or more embodiments of the invention or elements thereof can be implemented in the form of an apparatus including a memory and at least one processor that is coupled to the memory and operative to perform, or facilitate performance of, exemplary method steps.

Yet further, in another aspect, at least a portion of one or more embodiments of the invention or elements thereof can be implemented in the form of means for carrying out one or more of the method steps described herein; the means can include (i) specialized hardware module(s), (ii) software module(s) executing on one or more general purpose or specialized hardware processors, or (iii) a combination of (i) and (ii); any of (i)-(iii) implement the specific techniques set forth herein, and the software modules are stored in a tangible computer-readable recordable storage medium (or multiple such media). The means do not include transmission media per se or disembodied signals per se. Appropriate interconnections via bus, network, and the like can also be included.

Figure 7:
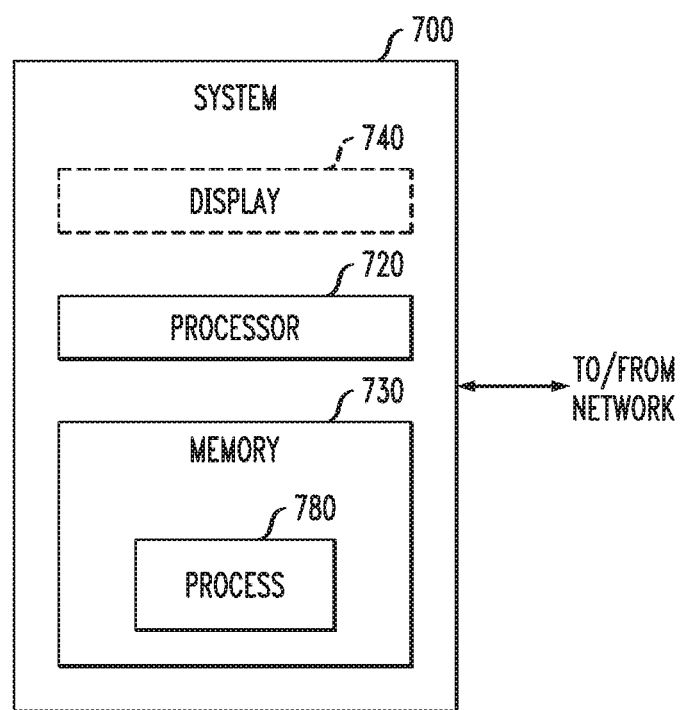
FIG. 7 is a block diagram of a computer system useful in connection with one or more aspects of the invention.

FIG. 7 is a block diagram of a system 700 that can implement at least some aspects of the invention, and is representative, for example, of one or more of the servers shown in the figures. As shown in FIG. 7, memory 730 configures the processor 720 to implement one or more methods, steps, and functions (collectively, shown as process 780 in FIG. 7). The memory 730 could be distributed or local and the processor 720 could be distributed or singular. Different steps could be carried out by different processors.

The memory 730 could be implemented as an electrical, magnetic or optical memory, or any combination of these or other types of storage devices. It should be noted that if distributed processors are employed, each distributed processor that makes up processor 720 generally contains its own addressable memory space. It should also be noted that some or all of computer system 700 can be incorporated into an application-specific or general-use integrated circuit. For example, one or more method steps could be implemented in hardware in an application specific integrated circuit (ASIC) or field-programmable gate array (FPGA) rather than using firmware. Display 740 is representative of a variety of possible input/output devices (e.g., keyboards, mice, and the like). Every processor may not have a display, keyboard, mouse or the like associated with it.

As is known in the art, at least a portion of one or more aspects of the methods and apparatus discussed herein may be distributed as an article of manufacture that itself includes a tangible computer readable recordable storage medium having computer readable code means embodied thereon. The computer readable program code means is operable, in conjunction with a computer system (including, for example, system 700 representing one or more servers in a national data center, regional data center, or head end; processor 306 of CPE 106; or the like), to carry out all or some of the steps to perform the methods or create the apparatuses discussed herein. A computer readable medium may, in general, be a recordable medium (e.g., floppy disks, hard drives, compact disks, EEPROMs, or memory cards) or may be a transmission medium (e.g., a network including fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk. The medium can be distributed on multiple physical devices (or over multiple networks). As used herein, a tangible computer-readable recordable storage medium is defined to encompass a recordable medium, examples of which are set forth above, but is defined not to encompass a transmission medium or disembodied signal.

The computer systems and servers and other pertinent elements described herein each typically contain a memory that will configure associated processors to implement the methods, steps, and functions disclosed herein. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

Accordingly, it will be appreciated that at least a portion of one or more embodiments of the invention can include a computer program comprising computer program code means adapted to perform one or all of the steps of any methods or claims set forth herein when such program is run, for example, on one or more servers in a national data center, regional data center, or head end; on CPE 106; and the like, and that such program may be embodied on a tangible computer readable recordable storage medium. As used herein, including the claims, unless it is unambiguously apparent from the context that only server software is being referred to, a "server" includes a physical data processing system (for example, system 700 as shown in FIG. 7) running one or more server programs. It will be understood that such a physical server may or may not include a display, keyboard, or other input/output components. Furthermore, as used herein, including the claims, a "router" includes a networking device with both software and hardware tailored to the tasks of routing and forwarding information.

Furthermore, it should be noted that any of the methods described herein can include an additional step of providing a system comprising distinct software modules embodied on one or more tangible computer readable storage media. All the modules (or any subset thereof) can be on the same medium, or each can be on a different medium, for example. The modules can include any or all of the components shown in the figures (e.g. in FIGS. 9 and 10) and/or other components discussed herein. The method steps can then be carried out using the distinct software modules of the system, as described above, executing on one or more hardware processors. Further, a computer program product can include a tangible computer-readable recordable storage medium with code adapted to be executed to carry out one or more method steps described herein, including the provision of the system with the distinct software modules.

Accordingly, it will be appreciated that at least a portion of one or more embodiments of the invention can include a computer program including computer program code means adapted to perform one or all of the steps of any methods or claims set forth herein when such program is implemented on a processor, and that such program may be embodied on a tangible computer readable recordable storage medium. Further, at least a portion of one or more embodiments of the present invention can include a processor including code adapted to cause the processor to carry out one or more steps of methods or claims set forth herein, together with one or more apparatus elements or features as depicted and described herein.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method comprising the steps of:
    assigning at least a first goal to a media asset, said media asset comprising content and metadata;
    simultaneously polling, by each of at least two of a plurality of processes of a workflow engine, said media asset from time-to-time to determine whether prerequisites of said at least two of said plurality of processes have been met, each of said plurality of processes configured to perform a corresponding action on said media asset, on a derivative of said media asset, or both; and
    performing, by at least one of said plurality of processes of said workflow engine for which said prerequisites have been met, said action to achieve at least a portion of said at least first goal.

2. The method of claim 1, wherein said acting step comprises, for all of said at least two of said plurality of processes of said workflow engine for which said prerequisites have been met, simultaneously acting on said media asset to achieve at least a portion of said at least first goal.

3. The method of claim 2, wherein, in said assigning step, said at least first goal comprises rendering said media asset ready for at least one of quadrature amplitude modulation playback, internet protocol streaming playback, internet protocol download, and quadrature amplitude modulation download.

4. The method of claim 3, wherein, in said polling step, said plurality of said processes for said workflow engine comprise a metadata normalization process, an encoding process, and a file movement process.

5. The method of claim 4, further comprising:
    determining a fraction of capacity at which said encoding process is currently operating; and
    carrying out at least one of:
        allocating additional hardware resources to said encoding process if said fraction of capacity at which said encoding process is currently operating exceeds a first threshold value; and
        de-allocating hardware resources from said encoding process if said fraction of capacity at which said encoding process is currently operating is less than a second threshold value.

6. The method of claim 4, further comprising:
    assigning at least a second goal to said media asset;
    assigning a first subset of said plurality of processes of said workflow engine to said first goal, said first subset of said plurality of processes comprising said plurality of processes of said workflow engine relevant to said at least first goal;
    assigning a second subset of said plurality of processes of said workflow engine to said second goal;
    for each of said second subset of said plurality of processes of said workflow engine, polling said media asset from time-to-time to determine whether prerequisites of each of said second subset of said plurality of processes have been met; and
    for at least two of said second subset of said plurality of processes of said workflow engine for which said prerequisites have been met, simultaneously acting on said media asset to achieve at least a portion of said second goal.

7. The method of claim 6, wherein at least one of said plurality of processes of said workflow engine is assigned to both said first subset of said plurality of processes of said workflow engine and said second subset of said plurality of processes of said workflow engine.

8. The method of claim 4, further comprising, for at least one of said plurality of processes of said workflow engine for which said prerequisites have not been met, flagging said media asset to indicate to another one of said plurality of processes of said workflow engine that it should act on said media asset to fulfill at least one of said prerequisites which has not been met.

9. The method of claim 4, wherein said polling of said media asset from time-to-time comprises periodic polling at a fixed time interval for each of said plurality of processes of said workflow engine relevant to said at least first goal.

10. The method of claim 4, wherein said polling of said media asset from time-to-time comprises polling for at least one of said plurality of processes of said workflow engine relevant to said at least first goal more frequently than at least another one of said plurality of processes of said workflow engine relevant to said at least first goal.

11. The method of claim 10, wherein said at least one of said plurality of processes of said workflow engine relevant to said at least first goal which is polled more frequently than said at least another one of said plurality of processes of said workflow engine relevant to said at least first goal is selected based on detecting that one of said plurality of processes of said workflow engine relevant to said at least first goal, different than said at least one of said plurality of processes which is polled more frequently, is actively fulfilling at least one of said prerequisites of said at least one of said plurality of processes which is polled more frequently.

12. The method of claim 10, wherein said at least another one of said plurality of processes of said workflow engine relevant to said at least first goal which is polled less frequently than said at least one of said plurality of processes of said workflow engine relevant to said at least first goal is selected based on detecting that said at least another one of said plurality of processes of said workflow engine relevant to said at least first goal which is polled less frequently has already acted on said media asset.

13. A method comprising the steps of:
assigning at least a first goal to a media asset, said media asset comprising content and metadata;
polling, by each of at least two of a plurality of processes of a workflow engine, said media asset from time-to-time to determine whether prerequisites of each of said plurality of processes have been met, each of said plurality of processes configured to perform a corresponding action on said media asset, on a derivative of said media asset, or both; and
simultaneously performing, by at least two of said plurality of processes of said workflow engine for which said prerequisites have been met, one or more actions to achieve at least a portion of said at least first goal.

14. An apparatus comprising:
a memory;
at least one processor coupled to said memory; and
a non-transitory persistent storage medium which contains instructions which, when loaded into said memory, configure said at least one processor to be operative to:
implement a content management system;
implement a workflow engine which orchestrates a plurality of processes;
assign at least a first goal to a media asset, said media asset comprising content and metadata;
simultaneously poll, by each of at least two of a plurality of processes of said workflow engine, said media asset from time-to-time to determine whether prerequisites of said at least two of said plurality of processes have been met, each of said plurality of processes configured to perform a corresponding action on said media asset, on a derivative of said media asset, or both; and
performing, by at least one of said plurality of processes of said workflow engine for which said prerequisites have been met, said action to achieve at least a portion of said at least first goal.

15. The apparatus of claim 14, wherein said instructions configure said at least one processor to, for all of said at least two of said plurality of processes of said workflow engine for which said prerequisites have been met, simultaneously act on said media asset to achieve at least a portion of said at least first goal.

16. The apparatus of claim 15, wherein said at least first goal comprises rendering said media asset ready for at least one of quadrature amplitude modulation playback, internet protocol streaming playback, internet protocol download, and quadrature amplitude modulation download.

17. The apparatus of claim 16, wherein said plurality of said processes for said workflow engine comprise a metadata normalization process, an encoding process, and a file movement process.

18. The apparatus of claim 17, wherein said instructions further configure said at least one processor to:
determine a fraction of capacity at which said encoding process is currently operating; and
carry out at least one of:
allocating additional hardware resources to said encoding process if said fraction of capacity at which said encoding process is currently operating exceeds a first threshold value; and
de-allocating hardware resources from said encoding process if said fraction of capacity at which said encoding process is currently operating is less than a second threshold value.

19. The apparatus of claim 17, wherein said instructions further configure said at least one processor to:
assign at least a second goal to said media asset;
assign a first subset of said plurality of processes of said workflow engine to said first goal, said first subset of said plurality of processes comprising said plurality of processes of said workflow engine relevant to said at least first goal;
assign a second subset of said plurality of processes of said workflow engine to said second goal;
for each of said second subset of said plurality of processes of said workflow engine, poll said media asset from time-to-time to determine whether prerequisites of each of said second subset of said plurality of processes have been met; and
for at least two of said second subset of said plurality of processes of said workflow engine for which said prerequisites have been met, simultaneously act on said media asset to achieve at least a portion of said second goal.

20. An apparatus comprising:
a memory;
at least one processor coupled to said memory; and
a non-transitory persistent storage medium which contains instructions which, when loaded into said memory, configure said at least one processor to be operative to:
implement a content management system;
implement a workflow engine which orchestrates a plurality of processes;
assign at least a first goal to a media asset, said media asset comprising content and metadata;
poll, by each of at least two of a plurality of processes of said workflow engine, said media asset from time-to-time to determine whether prerequisites of each of said plurality of processes have been met, each of said plurality of processes configured to perform a corresponding action on said media asset, on a derivative of said media asset, or both; and
simultaneously performing, by at least two of said plurality of processes of said workflow engine for which said prerequisites have been met, one or more actions to achieve at least a portion of said at least first goal.

* * * * *